US012588798B2

(12) United States Patent
Lee et al.

(10) Patent No.: US 12,588,798 B2
(45) Date of Patent: Mar. 31, 2026

(54) DISHWASHER

(71) Applicant: LG ELECTRONICS INC., Seoul (KR)

(72) Inventors: Dongho Lee, Seoul (KR); Jongyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 371 days.

(21) Appl. No.: 18/087,949

(22) Filed: Dec. 23, 2022

(65) Prior Publication Data

US 2023/0210345 A1 Jul. 6, 2023

(51) Int. Cl.
*A47L 15/48* (2006.01)

(52) U.S. Cl.
CPC ........... *A47L 15/488* (2013.01); *A47L 15/486* (2013.01); *B01D 2271/02* (2013.01); *B01D 2279/55* (2013.01)

(58) Field of Classification Search
CPC ............................. A47L 15/486; A47L 15/488
See application file for complete search history.

(56) References Cited

U.S. PATENT DOCUMENTS

| | | | |
|---|---|---|---|
| 3,242,934 A | 3/1966 | Heinicke et al. | |
| 5,524,358 A | 6/1996 | Matz | |

FOREIGN PATENT DOCUMENTS

| | | |
|---|---|---|
| CN | 107970018 | 5/2018 |
| CN | 209789798 | 12/2019 |
| CN | 111802996 | 10/2020 |

| | | | | |
|---|---|---|---|---|
| CN | 112168101 A | * | 1/2021 | .......... A47L 5/0086 |
| CN | 112220429 | | 1/2021 | |
| JP | 2002301000 | | 10/2002 | |
| KR | 950008361 B1 | * | 7/1995 | |
| KR | 20190105887 | | 9/2019 | |

OTHER PUBLICATIONS

Machine translation of KR950008361B1, dated Jul. 28, 1995. (Year: 1995).*
Machine translation of CN-112168101-A, dated Jan. 5, 2021. (Year: 2021).*
Machine translation of CN-111802996-A, dated Oct. 23, 2020. (Year: 2020).*
Extended European Search Report in European Appln. No. 22214782.9, mailed on Jun. 1, 2023, 9 pages.

* cited by examiner

*Primary Examiner* — Michael E Barr
*Assistant Examiner* — Kevin G Lee
(74) *Attorney, Agent, or Firm* — Fish & Richardson P.C.

(57) ABSTRACT

A dishwasher includes a filter member having a handle integrally provided at an upper cover of the filter member. The filter member is accommodated in a filter accommodation space of a filter housing, where a movement space of the filter member is larger than the filter member, thereby preventing damage to the filter material or a fall of contaminants into the filter housing effectively, during withdrawal and insertion of the filter member. A separation space defined between the filter housing and the upper cover of the filter member is closed by a gasket, in the state where the filter member is disposed in the filter housing completely, thereby preventing the flow of non-filtered air into the filter housing effectively.

18 Claims, 25 Drawing Sheets

80

884

887

886

883

8851(885)

8826
882

8821
8824
8823
8822

8811c
8811(881)
8811a
8811i2
8811i1
8811d

8811b1
8811f
8811g
8811b
8811j
881a 873
872
873
871b
8717
891
821
82

8715
8712

871
871b
8714

822

8812f
8812a
8812g
8812(881)

8812e2
881a
8812e3

8812d 8812e 8812b

DISHWASHER

CROSS-REFERENCE TO RELATED APPLICATIONS

This application claims priority to and the benefit of Korean Patent Application Nos. 10-2021-0194342, filed on Dec. 31, 2021, 10-2021-0194345, filed on Dec. 31, 2021, 10-2022-0028087, filed on Mar. 4, 2022, and 10-2022-0028088, filed on Mar. 4, 2022, the disclosures of which are incorporated herein by reference in their entirety.

TECHNICAL FIELD

Disclosed herein is a dishwasher, and in particular, a dishwasher in which a grip part, used as a handle at a time of insertion and withdrawal of a filter member, is integrally provided at an upper cover of the filter member, and during the withdrawal and insertion of the filter member, damage to a filter material or a fall of contaminants into a filter housing can be prevented effectively.

BACKGROUND

Dishwashers spray wash water such as water to a wash target such as cooking vessels, cooking tools and the like accommodated in them to wash the wash target. At this time, wash water used for washing a wash target can include detergent.

Ordinarily, dishwashers are comprised of a wash tub forming a wash space, a storage part accommodating wash targets in the wash tub, a spray arm spraying wash water to the storage part, and a sump storing water and supplying wash water to the spray arm.

Dishwashers help to reduce time and efforts taken to clean wash targets such as cooking vessels and the like after meals, thereby ensuring improvement in user convenience.

Ordinarily, dishwashers perform a washing process of washing wash targets, a rinsing process of rinsing the wash targets, and a drying process of drying the wash targets after the washing and rinsing processes.

In recent years, the drying stage of dishwashers involves supplying high-temperature dry air into the wash tub to reduce a drying period and promote the effect of sterilizing wash targets.

As a related art, a dishwasher provided with a hot air supply device that generates and supplies high-temperature dry air after the washing and rinsing stages is disclosed in U.S. Pat. No. 5,524,358 (prior art document 001).

The dishwasher according to prior art document 001 comprises a suction inlet, into which external air is suctioned, and a filter that are disposed at a baseboard side or a lateral surface side formed in the lower portion of the front surface of a door, such that impurities or dust and the like included in the external air are filtered and supplied into a tub.

However, in terms of the hot air supply device of prior art document 001, if the baseboard side is entirely closed or the dishwasher is built into the kitchen cabinet, the dishwasher is hardly applied, since the suction inlet and the filter are dispose at the front surface or lateral surface side of the dishwasher. That is, in design, the positions of the suction inlet and the filter vary depending on the sort of a dishwasher, causing an increase in the costs of designing or manufacturing a product.

For a filter to be disposed and replaced regardless of the sort of a product, technologies for withdrawing and inserting the filter through the bottom surface or the lower surface of a tub have been developed recently.

A filter member of the hot air supply device provided at the dishwasher can be withdrawn with an intermediate member that connects the filter member and a sealing cap.

Accordingly, during the withdrawal of the filter member, a hook connection part of the intermediate member, to which the filter member connects, is highly likely to be broken or damage. Further, after the separation of the filter member, the sealing cap and the filter member need to separate from each other, causing inconvenience.

Further, in terms of the hot air supply device provided at the dishwasher, since external air is drawn into the outer circumferential surface of the filter member and filtered, contaminants are gradually accumulated on the outer circumferential surface of the filter member.

Thus, during the withdrawn of the filter member and the separation of the filter member from the intermediate member, the user's hand is contaminated by the contaminants coming off the filter member, causing a hygiene problem.

Further, the hot air supply device provided at the dishwasher is not provided with a means of keeping the filter member in the right position since the filter member is simply fit-coupled to a filter accommodation space.

If the filter member escapes from its right position due to vibrations and an external impact, non-filtered air is drawn into the tub, deteriorating filtering efficiency.

In terms of the hot air supply device provided at the dishwasher, the filter member is disposed in a filter housing in the state where the outer surface of a filter material of the filter member is exposed outward, and an upper cover and a lower cover of the filter member is press-fitted and supported in the filter housing.

Thus, manufacturing tolerance between the upper cover and the filter housing and manufacturing tolerance between the lower cover and the filter housing are highly likely to cause non-filtered air to flow into a gap between the filter member and the filter housing.

Further, during the withdrawal and insertion of the filter member, the filter material can be damaged by the filter housing, contaminants accumulated on the outer circumferential surface of the filter member can fall into the dishwasher and contaminate the inside of the dishwasher.

Further, a fan of the hot air supply device provided at the dishwasher is disposed in the filter housing, and a fan motor and a PCB substrate are disposed outside the filter housing. If wash water leaks from a filter replacement hole formed at the tub, electronic components such as a fan motor and a PCB substrate are directly affected by the leakage of the wash water. That is, the dishwasher is provided with no means of protecting electronic components such as a fan motor and a PCB substrate from leaking wash water.

Further, a portion of the filter member of the hot air supply device, provided at the dishwasher, is disposed in the filter housing, and the remaining portion is disposed in a way that the remaining portion is exposed to the outside of the filter housing. Accordingly, external air can be drawn only through a portion of the outer circumferential surface of the filter member, exposed to the outside of the filter housing, and filtering is performed only through the portion exposed outward, causing a partial clog of the filter member. Thus, filtering efficiency can deteriorate rapidly within a short period of time.

Furthermore, the hot air supply device provided at the dishwasher is provided with no means of guiding the accurate position of a cylinder-shaped filter member during the insertion of the filter member for replacement. Thus, if the filter member is not disposed in the accurate position during the insertion of the filter member, non-filtered external air can flow into the filter housing, and dust and the like can be fixed to a wash target and contaminate the wash target.

PRIOR ART DOCUMENT

Patent Document (Document 001) U.S. Pat. No. 5,524,358

SUMMARY

Technical Problems

The first objective of the present disclosure is to provide a dishwasher in which a grip part, used as a handle at a time of insertion and withdrawn of a filter member, is integrally provided at an upper cover of the filter member, thereby enhancing user convenience and preventing damage to the filter member during separation of the filter member.

The second objective of the present disclosure is to provide a dishwasher in which external air is drawn through the upper surface and the lower surface of the filter member such that contaminants are filtered through the inner circumferential surface of a filter material, thereby significantly reducing the possibility that the user's hand is contaminated by contaminants coming off the filter member while the filter member is withdrawn.

The third objective of the present disclosure is to provide a dishwasher in which the grip part is pressurized downward and deformed elastically during the coupling of a sealing cap, thereby preventing the escape of the filter member from the right position and deterioration in filtering efficiency effectively.

The fourth objective of the present disclosure is to provide a dishwasher in which the filter member is entirely accommodated in a filter housing, and a filter accommodation space and a movement space where the filter member is disposed has a size greater than that of the filter member, thereby preventing damage to the filter material or a fall of contaminants into the filter housing effectively, during the withdrawal and insertion of the filter member.

The fifth objective of the present disclosure is to provides a dishwasher in which in the state where the filter member is disposed in the filter housing completely, a separation space formed between the filter housing and the upper cover of the filter member is closed by a gasket, thereby preventing the flow of non-filtered air into the filter housing effectively.

The sixth objective of the present disclosure is to provide a dishwasher in which the filter member is inserted through the lower surface of a tub at a time of replacing the filter member, is applicable regardless of the sort of a dishwasher and helps to enhance user convenience, a fan housing is entirely accommodated in the filter housing, and a means of blocking wash water leaking from the tub from flowing into the fan housing is provided, thereby preventing damage to electronic components such as a motor and a PCB substrate and the like, caused by the wash water effectively, and ensuring improvement in safety.

The seventh objective of the present disclosure is to provide a dishwasher in which the filter member is inserted through the lower surface of the tub at a time of replacing the filter member, is applicable regardless of the sort of a dishwasher and helps to enhance user convenience, a cylinder-shaped filter member is entirely accommodated in the filter housing, and external air is filtered while passing through the outer circumferential surface of the filter member after flowing into the filter member through the upper end and the lower end of the filter member, thereby preventing a partial clog of the filter member effectively and providing air of a sufficient flow rate.

The eighth objective of the present disclosure is to provide a dishwasher in which a means of guiding the cylinder-shaped filter member to an accurate position during the insertion of the filter member for replacement of the filter member is provided in the filter housing, thereby minimizing the flow of non-filtered external air into a fan, and ensuring a significant improvement in filtering efficiency.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A dishwasher according to the present disclosure comprises: a tub accommodating a wash target and having a wash space a front surface of which is open; and a dry air supply part being disposed at a lower portion side of the tub, generating dry airflow for drying the wash target and supplying the dry airflow into the tub, the dry air supply part, comprising: a filter member filtering air to be supplied to the wash space; and a filter housing having a coupling opening that allows the filter member to come in and out, at an upper end thereof, and accommodating the filter member in a way that the filter member comes in or out, the filter member, comprising: an upper cover having an upper opening into which air to be filtered is drawn and which is formed at a center of the upper cover in a penetrating manner; a lower cover being spaced downward from the upper cover and having a lower opening into which air to be filtered is drawn and which is formed at a center of a lower surface of the lower cover in a penetrating manner; and a filter material being disposed between the upper cover and the lower cover and filtering air drawn into the upper opening and the lower opening, wherein the dry air supply part further comprises a projection protruding from any one of the upper cover, the lower cover or the filter housing, and the projection guides the filter member to a position in which the filter member is accommodated or prevents an escape of the filter member after the filter member is accommodated.

The projection may comprise a grip part protruding upward from an upper surface of the upper cover.

The grip part may be an arch-shaped rib, and one end portion and the other end portion of the grip part may be fixed to the upper surface of the upper cover.

Further, one end portion and the other end portion of the grip part respectively may connect to the upper surface of the upper cover integrally.

Further, a horizontal width of the grip part may remain constant from one end portion of the arch-shaped rib toward the other end portion thereof.

Further, one end portion and the other end portion of the grip part may be spaced from each other horizontally with the upper opening therebetween.

Further, air may flow into the upper opening through a space between the grip part and the upper surface of the upper cover.

Further, air having passed through the upper opening may be drawn into an inner circumferential surface of the filter material, then filtered and discharged through an outer circumferential surface of the filter material.

Further, a filter accommodation space may be formed in the filter housing, and accommodate the filter member in a replaceable manner, and the filter housing's upper end that is open to allow the filter member to come in and out may be exposed to the wash space at least partially through the tub.

The dishwasher may further comprise a sealing cap that is detachably coupled to the upper end of the filter housing, to open and close the open upper end of the filter housing, and as the sealing cap is coupled to the upper end of the filter housing in a state in which the filter member is inserted into the filter accommodation space completely, the sealing cap may contact an upper surface of the grip part.

The sealing cap may be provided with a cap projection protruding toward the filter accommodation space, and as the cap projection contacts the grip part, the grip part may be elastically deformed at least partially.

The cap projection may be a cylindrical rib protruding downward from a bottom surface of the sealing cap, and an up-down position of a lower end portion of the cylindrical rib may remain constant.

Further, an outer diameter of the cap projection may be greater than a horizontal width of the grip part.

The filter housing may be provided with an upper suction opening which is formed at an upper side of the filter accommodation space and into which air to be drawn into the upper opening flows, and a position of contact between the cap projection and the grip part may be formed further upward than the upper suction opening with respect to an up-down direction.

The filter housing may have a coupling opening at an upper end thereof, the coupling opening allowing the filter member to come in and out, and the projection may comprise a gasket closing a separation space that is formed between the coupling opening and the filter member, and elastically contacting the filter member.

The gasket may comprise: a coupling part being provided in a cylindrical shape, and being fixed to an outer circumferential surface of an upper end of the filter housing that has the coupling opening; and a blocking part being provided in a circular plate shape that has an open hole therein, and integrally connecting to an upper end of the coupling part, wherein the coupling part and the blocking part may be made of an elastic material having predetermined elasticity.

As the coupling part is fixed to an upper end portion of the filter housing, the blocking part may cover the coupling opening of the filter housing partially.

Further, a perpendicular thickness of the blocking part may be less than a horizontal thickness of the coupling part.

Further, in a state in which the blocking part is fixed to the coupling opening, a diameter of the open hole of the blocking part may be less than an inner diameter of the coupling opening.

The filter member may comprise: an upper cover having an upper opening into which air to be filtered is drawn and which is formed at a center of the upper cover in a penetrating manner; a lower cover being spaced downward from the upper cover and having a lower opening into which air to be filtered is drawn and which is formed at a center of a lower surface of the lower cover in a penetrating manner; and a filter material being disposed between the upper cover and the lower cover and filtering air drawn into the upper opening and the lower opening, wherein outer diameters of the upper cover and the lower cover may be greater than an outer diameter of the filter material, and the outer diameter of the filter material may be less than a diameter of the open hole of the blocking part.

The outer diameter of the upper cover and the outer diameter of the lower cover may be the same.

The outer diameter of the upper cover and the outer diameter of the lower cover may be less than the inner diameter of the coupling opening.

The outer diameter of the upper cover and the outer diameter of the lower cover may be greater than the diameter of the open hole of the blocking part.

As the filter member is inserted into the filter housing completely, the upper cover may fall into a state of being inserted into the open hole of the blocking part.

As the upper cover is inserted into the open hole of the blocking part, the blocking part may elastically contact an outer circumferential surface of the upper cover.

Further, as the upper cover is inserted into the open hole of the blocking part, the blocking part may be elastically deformed at least partially.

Further, as the upper cover is inserted into the open hole of the blocking part, the separation space may be formed between the upper cover and the upper end portion of the filter housing, and the blocking part may close the separation space while a portion of the blocking part is deformed elastically.

The projection may comprise a filter guide rib being formed around a lower suction opening, protruding from the filter housing, and guiding the filter member's movement at a time of insertion of the filter member.

The lower suction opening may be a circular opening that is formed in a way that penetrates a bottom surface of the filter housing in the up-down direction, and the filter guide rib may be arranged around the lower suction opening, in a radial shape.

The filter guide rib may be arranged around the lower suction opening at regular intervals.

The filter guide rib may protrude from the bottom surface of the filter housing and extend upward along a direction parallel with the direction in which the filter member is inserted, and a lower end of the filter guide rib may be integrally formed on the bottom surface of the filter housing.

The projection may further comprise a first protruding rib being formed on the bottom surface of the filter housing, extending along a circumference of the lower suction inlet and protruding upward, and a second protruding rib being formed outside the first protruding rib in a radial direction thereof, extending along a perimeter of the first protruding rib and protruding upward, wherein the lower end of the filter guide rib may connect to the second protruding rib.

Further, the lower end of the filter guide rib may be integrally formed together with the second protruding rib.

Further, a radial distance from a center of the lower suction inlet to the lower end of the filter guide rib may be the same as a radius of an inner surface of the second protruding rib.

Further, a thickness of the filter guide rib may remain constant in a direction farther from the center of the lower suction opening.

Further, an inclined surface may be provided on a radial inner side end portion surface of the filter guide rib, and a distance between the inclined surface and the filter member may gradually decrease from an upper end of the filter guide rib toward the lower suction inlet in a downward direction.

Further, a perpendicular surface may be provided on a radial inner side end portion surface of the filter guide rib, and may be formed at a lower side of the inclined surface and contact the outer circumferential surface of the filter member at least partially at a time of insertion of the filter member.

The filter guide rib may comprise: a first guide rib having a radial outer side end portion surface that connects to an inner surface of the filter housing; and a second guide rib having a radial outer side end portion surface that separates from the inner surface of the filter housing.

Further, an entire height of the first guide rib may be greater than an entire height of the second guide rib, with respect to a direction parallel with the direction of insertion of the filter member.

Further, a height of the inclined surface of the first guide rib may be greater than a height of the inclined surface of the second guide rib, with respect to a direction parallel with the direction of insertion of the filter member.

The fan housing may be fixed to the fan housing accommodation space in a state of separating from the bottom surface of the filter housing, a suction inlet of the fan housing may be provided on a lower surface of the fan housing and be open toward the bottom surface of the filter housing, and the suction inlet of the fan housing may be formed in a position lower than that of an upper end of the second guide rib with respect to the up-down direction.

Further, the upper end of the second guide rib may be formed in a position lower than an upper surface of the fan housing and higher than the lower surface of the fan housing with respect to the up-down direction.

Further, a blocking rib may be provided on an upper surface of the filter housing, and be disposed between the upper end of the filter housing and the vent hole and protrude upward from the upper surface of the filter housing, with respect to a horizontal direction.

The blocking rib may be provided as a barrier shape in which a length in a direction across a flow direction of the dry airflow is greater than a thickness and an up-down height in a direction parallel with the flow direction of the dry airflow.

The blocking rib may be integrally formed on the upper surface of the filter housing.

Further, an up-down position of an upper end of the blocking rib may remain constant in a direction across the flow direction of the dry airflow.

The up-down position of the upper end of the blocking rib may be higher than an up-down position of the vent hole.

The vent hole may be a circular opening, and the length of the blocking rib may be greater than a diameter of the vent hole.

The blocking rib may extend linearly from a front edge of the upper surface of the filter housing to a rear edge thereof.

The filter housing may comprise a hollow hole vent duct having an upper end that integrally connects to the upper surface of the filter housing, and a lower end that extends toward the upper surface of the fan housing, and the vent hole may be provided at an upper end of the vent duct.

The lower end of the vent duct may contact an upper end of the fan housing.

The filter housing may further comprise a drain channel having one end portion that connects to the lower end of the vent duct, and the other end portion that extends to a front surface of the filter housing.

The drain channel may extend linearly from one end portion thereof to the other end portion thereof.

The dishwasher may further comprise a leakage detecting part being disposed under the filter housing and detecting whether wash water leaks from the drain channel, and the leakage detecting part may be disposed closer to the front surface of the filter housing than a rear surface thereof.

Advantageous Effects

A dishwasher according to the present disclosure has the advantage of enhancing user convenience since a filter member is inserted through the lower surface of a tub at a time of replacing the filter member and is applicable regardless of the sort of a dishwasher.

The dishwasher has the advantage of enhancing user convenience at a time when the filter member is inserted and withdrawn for replacement, since a grip part is integrally formed at an upper cover of the filter member.

The dishwasher has the advantage of preventing damage to the filter member effectively while the filter member is withdrawn.

The dishwasher has the advantage of significantly reducing the possibility that the user's hand is contaminated by contaminants during the withdrawal of the filter member since the contaminants are filtered through the inner circumferential surface of a filter material.

The dishwasher has the advantage of effectively preventing the escape of the filter member from the right position, caused by vibrations and an impact and the deterioration in filtering efficiency of the filter member since the grip part is pressurized downward through a sealing cap.

The dishwasher has the advantage of preventing damage to the filter material during the withdrawal and insertion of the filter member or a fall of contaminants into a filter housing since a filter accommodation space and a movement space where the filter member is disposed has a size greater than that of the filter member.

The dishwasher has the advantage of preventing the flow of non-filtered air into the filter housing and the deterioration in filtering efficiency effectively since in the state where the filter member is disposed in the filter housing completely, a separation space formed between the filter housing and the upper cover of the filter member is closed by a gasket.

The dishwasher has the advantages of closing the separation space regardless of manufacturing tolerance of the filter member and the filter housing and preventing non-filtered air or wash water from flowing through the separation space effectively since the separation space formed between the filter housing and the upper cover of the filter member is touched by the gasket having predetermined elasticity evenly and entirely throughout the circumferential direction.

The dishwasher has the advantage of ensuring a sufficient flow rate since external air flows into the filter member through at least two suction openings.

The dishwasher has the advantage of ensuring a significant improvement in filtering efficiency since external air is drawn only through an upper suction opening and a lower suction opening and since the filter member is supported in a surface contact state, in the filter housing.

The dishwasher has the advantage of preventing damage to electronic components such as an air blowing fan, an air blowing motor and the like in the filter housing since leaking wash water is blocked from flowing toward the electronic components.

The dishwasher has the advantages of enhancing user convenience and preventing deterioration in filtering efficiency since a means of guiding the movement of the filter member at a time of the insertion of the filter member is provided in the filter housing.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
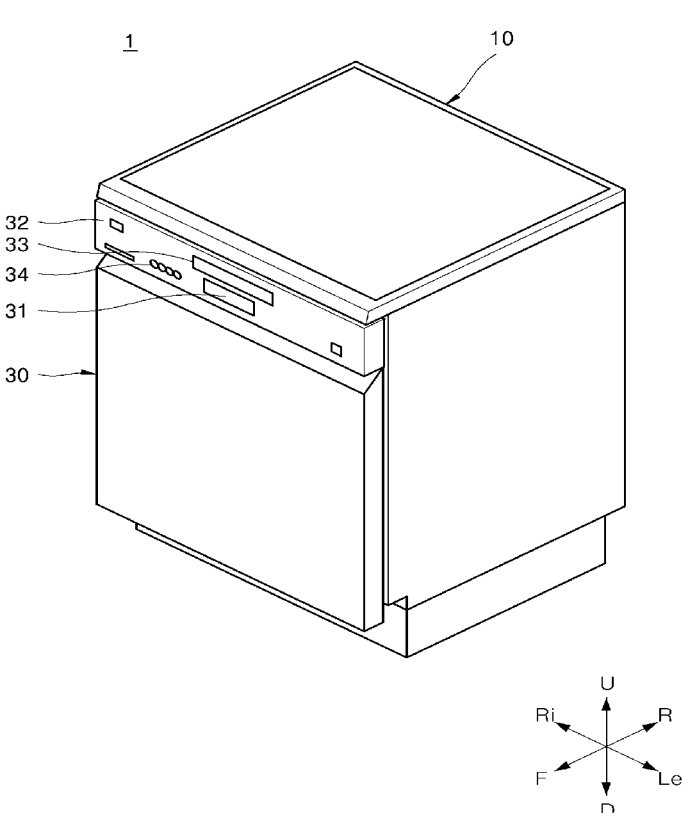
FIG. 1 is front perspective view showing a dishwasher of one embodiment.

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Below, preferred embodiments according to the disclosure are specifically described with reference to accompanying drawings. In the drawings, identical reference numerals can denote identical or similar components.

The terms "first", "second" and the like are used herein only to distinguish one component from another component. Thus, the components should not be limited by the terms. Certainly, a first component can be a second component, unless stated to the contrary.

Throughout the disclosure, each component can be provided as a single one or a plurality of ones, unless explicitly stated to the contrary.

When one component is described as being "in the upper portion (or lower potion)" or "on (or under)" another component, one component can be directly on (or under) another component, and an additional component can be interposed between the two components.

When any one component is described as being "connected", "coupled", or "connected" to another component, any one component can be directly connected or coupled to another component, but an additional component can be "interposed" between the two components or the two components can be "connected", "coupled", or "connected" by an additional component.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Hereafter, the subject matter of the present disclosure is described with reference to the drawings showing the configuration of the dishwasher 1 of the embodiment.

[Entire Structure of Dishwasher]

Hereafter, the entire structure of the dishwasher 1 of one embodiment is describer with reference to the accompanying drawings.

Figure 2:
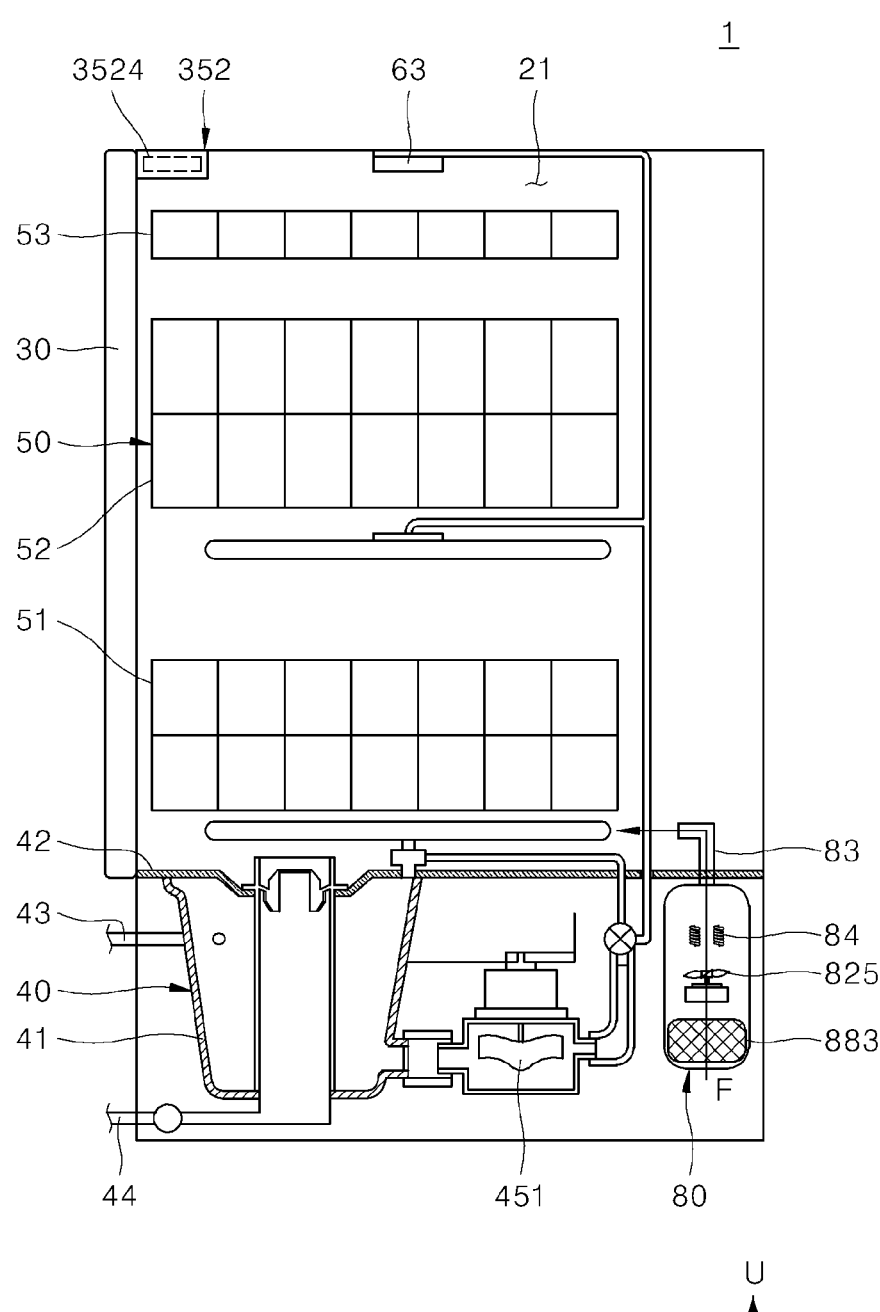
FIG. 2 is a schematic cross-sectional view showing the dishwasher in FIG. 1.
Figure 2:
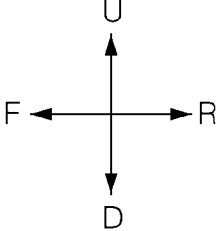

FIG. 1 is a front perspective view showing a dishwasher according to the present disclosure, and FIG. 2 is a schematic cross-sectional view schematically showing the inner structure of the dishwasher according to the present disclosure.

As illustrated in FIGS. 1 and 2, the dishwasher 1 according to the present disclosure comprises a case 10 forming the exterior of the dishwasher 1, a tub 20 being installed in the case 10, forming a wash space 21 in which a wash target is washed and having a front surface that is open, a door 30 opening and closing the open front surface of the tub 20, a driving part 40 being disposed under the tub 20 and supplying, collecting, circulating and draining wash water for washing a wash target, a storage part 50 being provided detachably in the wash space 21 in the tub 20 and allowing a wash target to be mounted on, and a spray part 60 being installed near the storage part 50 and spraying wash water for washing a wash target.

At this time, wash targets mounted in the storage part 50 may be cooking vessels such as bowls, dishes, spoons, chopsticks, and the like, and other cooking tools, for example. Hereafter, the wash targets are referred to as cooking vessels, unless mentioned otherwise.

The tub 20 may be formed into a box the front surface of which is open entirely, and may correspond to a so-called wash tub.

The tub 20 may have a wash space 21 therein, and its open front surface may be opened and closed by the door 30.

The tub 20 may be formed in a way that a metallic sheet having strong resistance against high-temperature and moisture, e.g., a stainless steel-based sheet, is pressed.

Additionally, a plurality of brackets may be disposed on the inner surfaces of the tub 20 and allow functional components such as a storage part 50, a spray part 60 and the like, which are described below, to be supported and installed in the tub 20.

The driving part 40 may comprise a sump 41 storing wash water, a sump cover 42 distinguishing the sump 41 from the tub 20, a water supply part 43 supplying wash water to the sump 41 from the outside, a drain part 44 discharging wash water of the sump 41 to the outside, and a water supply pump 45 and a supply channel 46 for supplying wash water of the sump 41 to the spray part 60.

The sump cover 42 may be disposed at the upper side of the sump 41, and distinguish the sump 41 from the tub 20. Additionally, the sump cover 42 may be provided with a plurality of return holes for returning wash water, having sprayed to the wash space 21 through the spray part 60, to the sump 41.

That is, wash water having sprayed toward cooking vessels from the spray part 60 may fall to the lower portion of the wash space 21 and return to the sump 41 through the sump cover 42.

The water supply pump 45 is provided in a lateral portion or the lower portion of the sump 41, and pressurizes wash water and supplies the same to the spray part 60.

One end of the water supply pump 45 may connect to the sump 41, and the other end may connect to the supply channel 46. The water supply pump 45 may have an impeller 451, a motor 453 and the like, therein. As power is supplied to the motor 453, the impeller 451 may rotate, and wash water of the sump 41 may be pressurized and then supplied to the spray part 60 through the supply channel 46.

The supply channel 46 may selectively supply the wash water supplied by the water supply pump 45 to the spray part 60.

For example, the supply channel 46 may comprise a first supply channel 461 connecting to a lower spray arm 61, and a second supply channel 463 connecting to an upper spray arm 62 and a top nozzle 63. The supply channel 46 may be provided with a supply channel diverting valve 465 selectively opening and closing the supply channels 461, 463.

At this time, the supply channel diverting valve 465 may be controlled to allow each of the supply channels 461, 463 to be opened consecutively or opened simultaneously.

The spray part 60 is provided to spray wash water to cooking vessels and the like stored in the storage part 50.

Specifically, the spray part 60 may comprise a lower spray arm 61 being disposed under the tub 20 and spraying wash water to a lower rack 51, an upper spray arm 62 being disposed between the lower rack 51 and an upper rack 52 and spraying wash water to the lower rack 51 and the upper rack 52, and a top nozzle 63 being disposed in the upper portion of the tub 20 and spraying wash water to a top rack 53 or the upper rack 52.

In particular, the lower spray arm 61 and the upper spray arm 62 may be rotatably provided in the wash space 21 of the tub 20, and spray wash water toward cooking vessels in the storage part 50 while rotating.

The lower spray arm 61 may be rotatably supported at the upper side of the sump cover 42 such that the lower spray arm 61 may spray wash water to the lower rack 51 while rotating under the lower rack 51.

Additionally, the upper spray arm 62 may be rotatably supported by a spray arm holder 467 such that the upper spray arm 62 may spray wash water while rotating between the lower rack 51 and the upper rack 52.

The tub 20 may be further provided with a means on a lower surface 25 thereof, to enhance washing efficiency, and the means diverts the direction of wash water having sprayed from the lower spray arm 61 to an upward direction (U-direction).

Since a well-known configuration can be applied to the configuration of the spray part 60, detailed description of the configuration of the spray part 60 is omitted hereafter.

The storage part 50 for storing cooking vessels may be provided in the wash space 21.

The storage part 50 may be withdrawn through the open front surface of the tub 20 from the inside of the tub 20.

For example, FIG. 2 shows an embodiment provided with a storage part comprising a lower rack 51 that is disposed in the lower portion of the tub 20 and stores relatively large-sized cooking vessels, an upper rack 52 that is disposed at the upper side of the lower rack 51 and stores medium-sized cooking vessels, and a top rack 53 that is disposed in the upper portion of the tub 20 and stores small-sized cooking vessels and the like. However, the subject matter of the present disclosure is not limited to the embodiment. Hereafter, a dishwasher that is provided with three storage parts 50, as illustrated, is described.

Each of the lower rack 51, the upper rack 52 and the top rack 53 may be withdrawn outward through the open front surface of the tub 20.

To this end, the tub 20 may have a guide rail, on both lateral walls thereof that form the inner circumferential surface of the tub 20, and for example, the guide rail may comprise an upper rail, a lower rail, a top rail and the like.

Each of the lower rack 51, the upper rack 52 and the top rack 53 may be provided thereunder with wheels. A user may withdraw the lower rack 51, the upper rack 52 and the top rack 53 outward through the front surface of the tub 20 to easily store cooking vessels on the racks or take out cooking vessels from the racks after a washing process.

The guide rail 54 may be provided as a fixed guide rail that guides the withdrawal and insertion of the spray part 60 in the form of a simple rail or as a stretchable guide rail which guides the withdrawal and storage of the spray part 60 and the withdrawal distance of which increases as the spray part 60 is withdrawn.

The door 30 is used for opening and closing the open front surface of the tub 20 that is described above.

Ordinarily, a hinge part for opening and closing the door 30 is provided in the lower portion of the open front surface, and the door 30 is open while rotating around the hinge part as a rotation axis.

The door 30 may be provided with a handle 31 and a control panel 32 on the outer surface thereof. The handle 31 is used for opening the door 30, and the control panel 32 is used for controlling the dishwasher 1.

As illustrated, the control panel 32 may be provided with a display 33 that visually displays information on a current operation state and the like of the dishwasher, and a button part 34 comprising a selection button to which the user's selection manipulation is input, a power button to which the user's manipulation for turning on-off the power source of the dishwasher is input, and the like.

The inner surface of the door 30 may form a mounting surface that supports the lower rack 51 of the storage part 50 as the door 30 is fully opened as well as forming one surface of the tub 20 as the door 30 is closed.

To this end, as the door 30 is fully opened, the inner surface of the door 30 forms a horizontal surface in the same direction where the guide rail 54, by which the lower rack 51 is guided, extends, for example.

As illustrated in FIG. 2, a door automatic opening module 352 for automatically opening the door outside of the upper surface of the tub 20.

When dry air is supplied into the tub 20 as a dry air supply part 80 described hereafter operates, the door automatic opening module 352 moves the door 30 to a predetermined opening position to open a front surface 22 of the tub 20 partially.

Accordingly, air that becomes moist while cooking vessels are dried may be discharged through the upper side of the open front surface 22 of the tub 20.

For example, the door automatic opening module 352 may be provided with a push rod 3524 that rotates the upper end of the rear surface of the door 30 to the opening position.

Additionally, the dry air supply part 80 may be provided under the tub 20, and generate high-temperature or low-temperature dry air and supply the same into the wash space in the tub 20.

As illustrated, the dry air supply part 80 may comprise a filter member 883 that filters external air, an air blowing fan 825 that generates dry airflow, a heater 84 that heats dry airflow, and an airflow guide 83 that is disposed in the tub and guides dry airflow.

The tub 20 may have a dry air supply hole 254 on the lower surface of the tub 20 to draw high-temperature dry air generated in the dry air supply part into the tub 20.

Hereafter, a detailed configuration of the dry air supply part 80 is described with reference to FIG. 3.

[Detailed Configuration of Dry Air Supply Part]

Hereafter, the detained configuration of the above-described dry air supply part 80 is described with reference to FIGS. 3 to 9.

Figure 3:
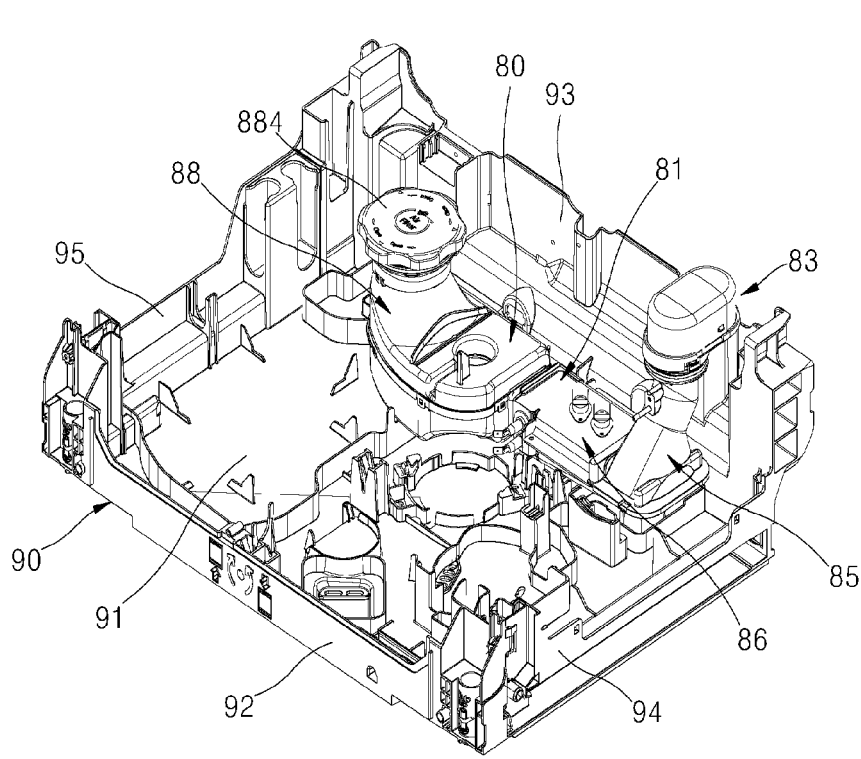
FIG. 3 is a front perspective view showing a dry air supply part of the dishwasher of one embodiment, which is accommodated in a base.

As illustrated in FIG. 3, the dry air supply part 80 may be accommodated in a base 90 and may be disposed to be supported by a lower surface 91 of the base 90.

For example, the dry air supply part 80 may be disposed in a position adjacent to a rear surface 93 of the base 90, and disposed in a position between a leakage detecting part and the rear surface 93 of the base 90, approximately in parallel with the rear surface 93 of the base 90.

The position in which the dry air supply part is disposed may be selected considering the characteristics of the dry air supply part 80 that generates heat of about 100° C. or greater in a high-temperature dry air supply mode. That is, the dry air supply part may be disposed to avoid electronic components that are greatly affected by high-temperature heat.

Additionally, the arrangement position of the dry air supply part may be selected based on the position of a dry air supply hole 254 formed on the lower surface 25 of the tub 20. That is, considering the user's safety, the dry air supply hole 254 into which dry air flows may be formed at the corner of the lower surface 25 of the tub 20, which is adjacent to the rear surface and the left side surface of the tub 20.

For the dry air supply part 80 to effectively generate dry air and supply the same to the dry air supply hole 254 formed in the above-described position, the dry air supply part 80 may be disposed at the lower side of the dry air supply hole 254.

The arrangement position of the dry air supply part 80 is described exemplarily. The dry air supply part 80 may be disposed near a left side surface 94, a right side surface 95 or a front surface 92 of the base 90 rather than the rear surface 93 of the base 90. Hereafter, the dry air supply part 80 disposed near the rear surface 93 of the base 90 approximately in parallel with the rear surface 93 is described, but the position of the dry air supply part 80 is not limited.

Figure 4:
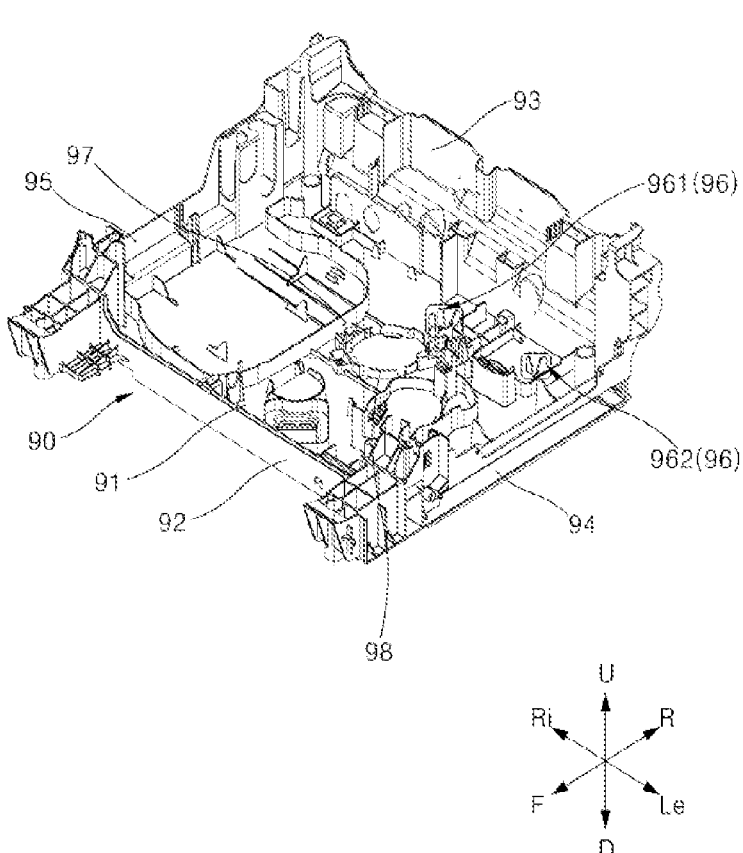
FIG. 4 is a front perspective view of FIG. 3 without the dry air supply part.

Additionally, as illustrated in FIG. 4, a support rib 96 for supporting the dry air supply part 80 and preventing the escape of the dry air supply part 80, a plurality of guide ribs 98 for setting the position of a leakage detecting part that detects whether wash water leaks from the tub 20 and preventing the escape of the leakage detecting part, and a wash water rib 97 for guiding wash water being discharged from the dry air supply part 80 to the leakage detecting part may be provided on the lower surface 91 of the base 90.

The support rib 96, the guide ribs 98 and the wash water rib 97 may be formed integrally on the lower surface 91 of the base 90, for example.

As illustrated, the support rib 96 may be divided into a first support rib 961 that supports the mid portion of the dry air supply part 80 from below, and a second support rib 962 that supports the left side of the dry air supply part 80 from below.

A first leg 891, a second leg 892 and a third leg 893 of the dry air supply part 80 described hereafter may be coupled to a support rib 961, based on a non-fastening method. That is, the first leg 891, the second leg 892 and the third leg 893 may be simply held at the support rib without an additional fastening means such that the dry air supply part 80 may be supported in up-down, front-rear and left-right directions.

Figure 5:
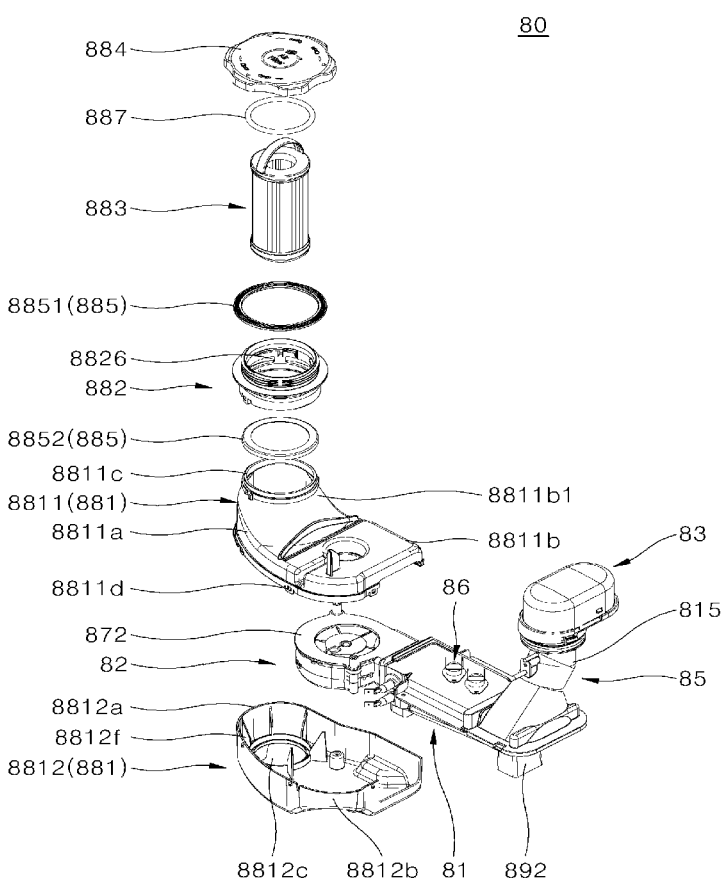
FIG. 5 is an exploded perspective view showing the dry air supply part in FIG. 3.
Figure 6:
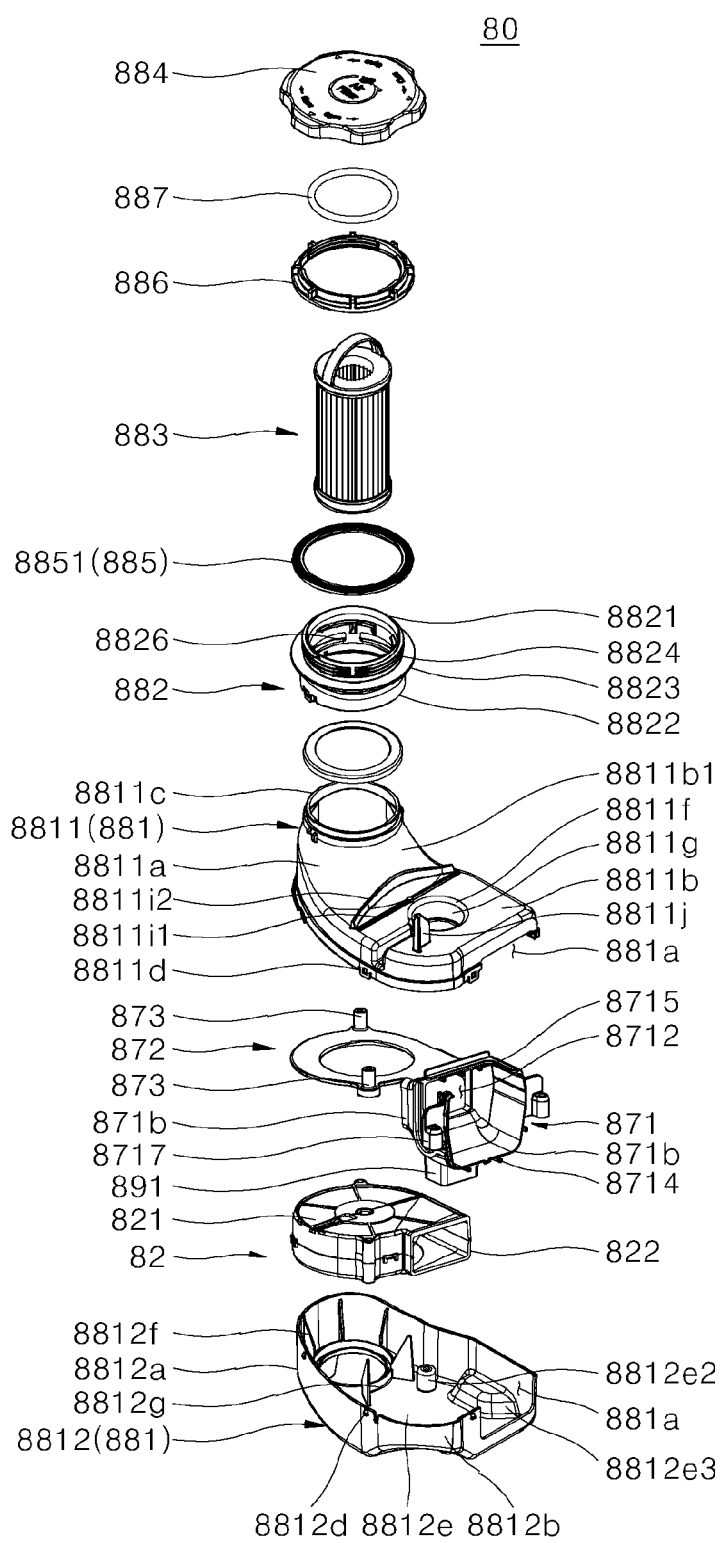
FIGS. 6 and 7 are exploded perspective views showing detailed configurations of a filter member and a filter housing in FIG. 4.
Figure 7:
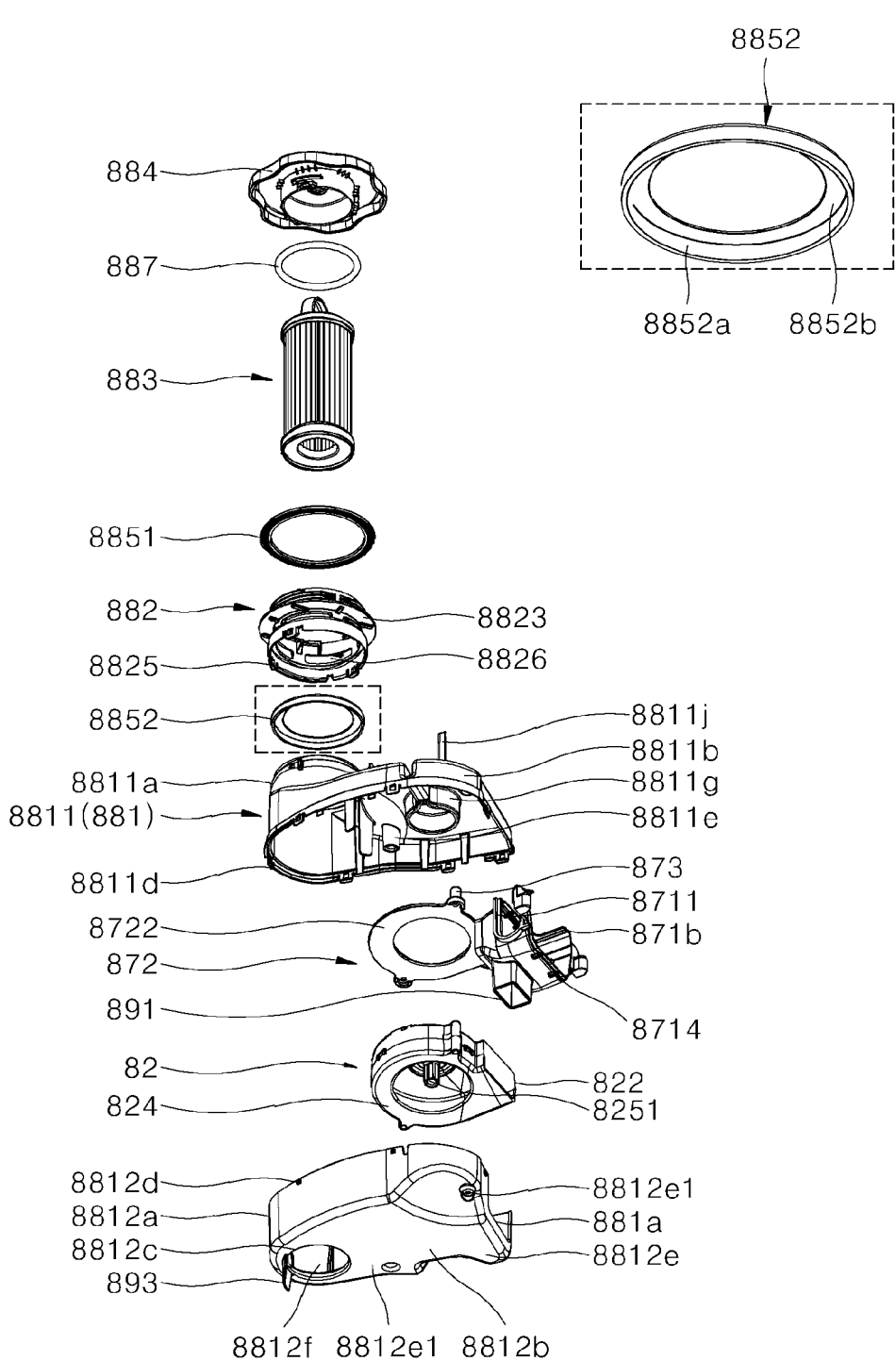

FIGS. 5 to 7 show a detailed configuration of the dry air supply part 80.

As illustrated, the dry air supply part 80 generating dry air and supplying the same into the tub 20 may comprise an air blowing fan that generates dry airflow F to be supplied into the tub 20, a heater 84 that heats dry air, a heater housing 81 that has an air passage in which the heater 84 is accommodated, and a filtering part 88 that filters air to be suctioned into the air blowing fan.

The air blowing fan is disposed at the upstream side in the direction of dry airflow F with respect to the heater 84 and the heater housing 81, and accelerates air to the air passage formed in the heater housing 81 to generate dry airflow F.

The air blowing fan, and an air blowing motor generating rotational driving force of the air blowing fan may be mutually modularized, and form an assembly in a way that the air blowing fan and the air blowing motor are accommodated in a fan housing 82.

The air blowing fan and the fan housing 82 may be fixed to a housing connector 87 that connects a filer housing 881 of the below-described filtering part 88 and the heater housing 81.

Specifically, the air blowing fan and the fan housing 82 may be accommodated entirely in the filter housing 881 in the state of being fixed to the housing connector 87.

The type of the air blowing fan to be applied to the dry air supply part 80 is not limited, but a sirocco fan, for example, is preferred considering the position and space limitations in the installation of the air blowing fan.

When a sirocco fan is applied as illustrated, filtered air may be suctioned from a lower surface 824 of the fan housing 82, in a direction parallel a direction from the center of the sirocco fan to the rotational axis of the same, and be accelerated and discharged outward in the radial direction.

The accelerated and discharged air may form dry airflow F and be drawn into the air passage in the heater housing 81 through the fan housing 82 and an inlet 8712 of the housing connector 97.

At this time, the air blowing fan, e.g., a sirocco fan, and a rotation shaft 8251 of the motor may be disposed to have directionality approximately parallel with the up-down direction (U-D direction), and filtered air may be suctioned through the lower surface 824 of the fan housing 82, for example.

Further, a PCB substrate for controlling the moor may be built into an upper surface 821 of the fan housing 82, which corresponds to the opposite side of the lower surface 824 into which filtered air is suctioned.

The fan housing 82, as illustrated, may be fixed to a ring-type connection tab 872 provided at the housing connector 87 through a fastening means such as a screw bolt and the like, for example.

Figure 8:
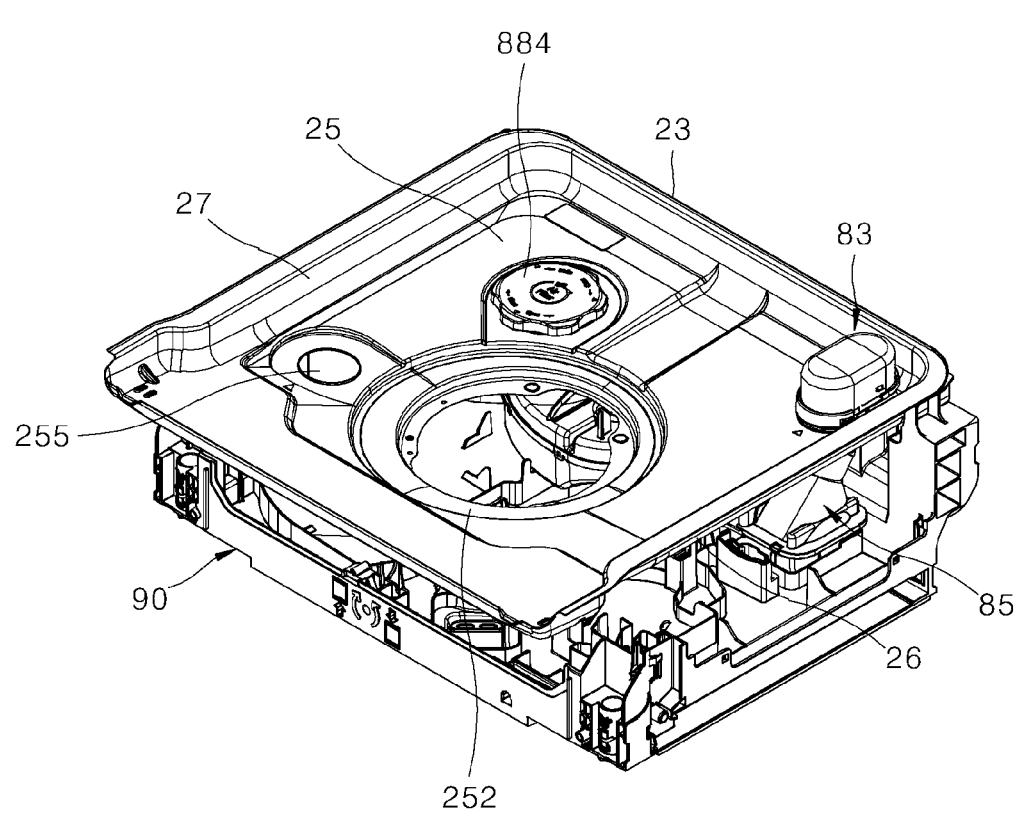
FIGS. 8 and 9 are front perspective views showing a bottom tub coupled to FIG. 3.
Figure 9:
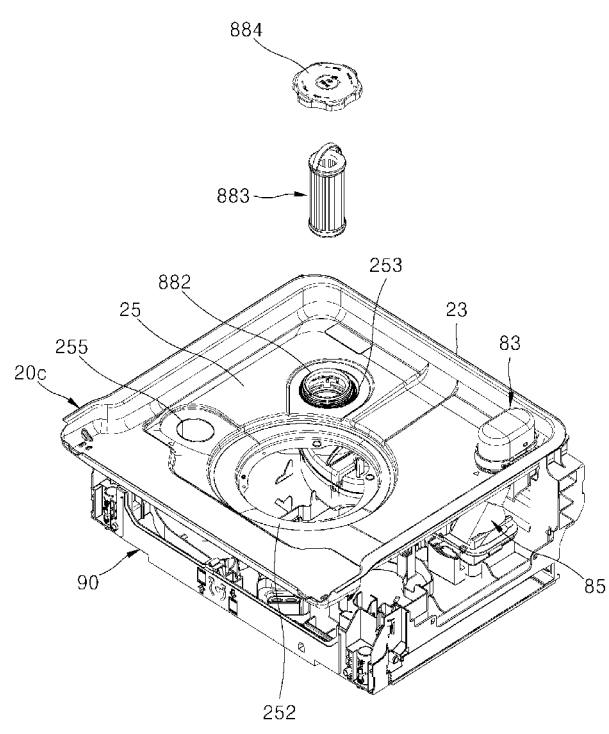

The connection tab 872 may extend from the inlet 8712 of a connector main body 871 in a direction that the connection tab 872 covers an upper surface 821 of the fan housing 82, and may have a pair of fastening bosses 873 that extends from the upper surface of the connection tab 872 in the upward direction (U-direction), as illustrated in FIGS. 7 and 8.

The pair of fastening bosses 873 may be coupled to a guide boss 8811e that is provided in a first housing 8811 corresponding to the upper housing of the filtering part 88, in the state of being disposed on the base 90.

The connector main body 871 of the housing connector 87 is coupled to an open front end of the heater housing 81 that is disposed downstream with respect to the flow direction of dry airflow, and together with the heater housing 81, forms an air passage C through which dry airflow flows.

To this end, the connector main body 871 may be formed into a hollow hole-shaped box that has a vacant inner portion.

On the inner surface of the connector main body 871, the cross-sectional area of the air passage C may expand gradually along the flow direction of dry airflow, and the cross-sectional area of a rear end portion 871b to which the heater housing 81 is coupled may be approximately the same as that of the front end portion of the heater housing 81. By doing so, the flow loss of dry airflow may be minimized.

To support the fan housing 82 and the heater housing 81, the first leg 891 protruding toward the base may be integrally formed under the connector main body 871.

In the illustrative embodiment, the upper surface and the front surface of the box-shaped connector main body 871 may be open at least partially.

The connector main body 871's upper surface and front surface that are open at least partially provides a passage into which the heater 84 enters while the heater 84 is disposed and fixed to the inside of the air passage C.

The heater 84 may be indirectly supported in the state of separating from the heater housing 81 and a connector main body 871.

The front end side of the heater 84 may be supported by a terminal fixation part, in the state of separating from the connector main body 871. A pair of terminals may be fixed to the front surface of the terminal fixation part, in the state of protruding outward.

The partially open front surface of the connector main body 871 may have a fixation slot 8711 having a U shape that corresponds to the outer shape of the terminal fixation part, and the terminal fixation part is coupled to the fixation slot 8711 in a sliding manner.

The up-down slide of the terminal fixation part may be guided by the edge of the fixation slot 8711, and may have a guide groove to be coupled with the edge of the fixation slot 8711.

The partially open upper end of the connector main body 871 may be covered and shielded by an upper housing 812.

A plurality of second support ribs 8715 may be provided under a coupling surface 8716, and support the front end portion of the upper housing 812 having entered into the connector main body 871 from below.

The entirely open rear end portion 871b of the connector main body 871 may be fixed while being fitted and coupled to the heater housing 81.

At this time, the rear end portion 871b of the connector main body 871 may be fitted and coupled to the heater housing 81 in a way that the rear end portion 871b is partially inserted into the heater housing 81.

To form a fit coupling embodying surface-to-surface contact, a plurality of first support ribs 8714 may be provided at the rear end portion 871b of the connector main body 871, as illustrated.

The heater 84 (FIG. 10) is disposed in the air passage formed in the heater housing 81, and preferably, is directly exposed to dry airflow F in the air passage and heats the dry airflow F.

When the dry air supply part 80 supplies high-temperature dry air, power may be supplied to the heater 84, and the heater 84 may heat dry air, and when the dry air supply part 80 supplies low-temperature dry air, the supply of power to the heater 84 may be cut off, and the heater 84 may stop operating.

At this time, when low-temperature dry air is supplied, the air blowing motor may keep operating to generate dry airflow F.

The type of the heater 84 provided in the dry air supply part 80 of one embodiment is not limited, but a tube-type sheath heater may be selected since the sheath heater has a relatively simple structure, ensures excellent heat generation efficiency and helps to prevent electric leakage caused by the reverse inflow of wash water that comes in from the tub 20 reversely, for example.

To enhance heat exchange efficiency, the heater 84 that is a sheath heater may have a stereoscopic shape with a plurality of bends, to be directly exposed to dry airflow F at the air passage in the heater housing 81 and ensure a maximum heat transfer surface.

One end portion and the other end potion of the heater 84 may pass and extend through the front surface of the connector main body 871 of the housing connector 87.

Additionally, a pair of terminals may be formed in one end portion and the other end portion of the heater 84 and be supplied with power.

As illustrated, the pair of terminals may be installed and fixed to the connector main body 871 through a terminal fixation part.

At this time, a fixation slot 8711 may be provided on the front surface of the connector main body 871 such that the terminal fixation part is fit-coupled to the front surface of the connector main body 871 in a sliding manner.

Additionally, the front end side of the heater 84, as described above, may be fixed and supported through the terminal fixation part.

Figure 10:
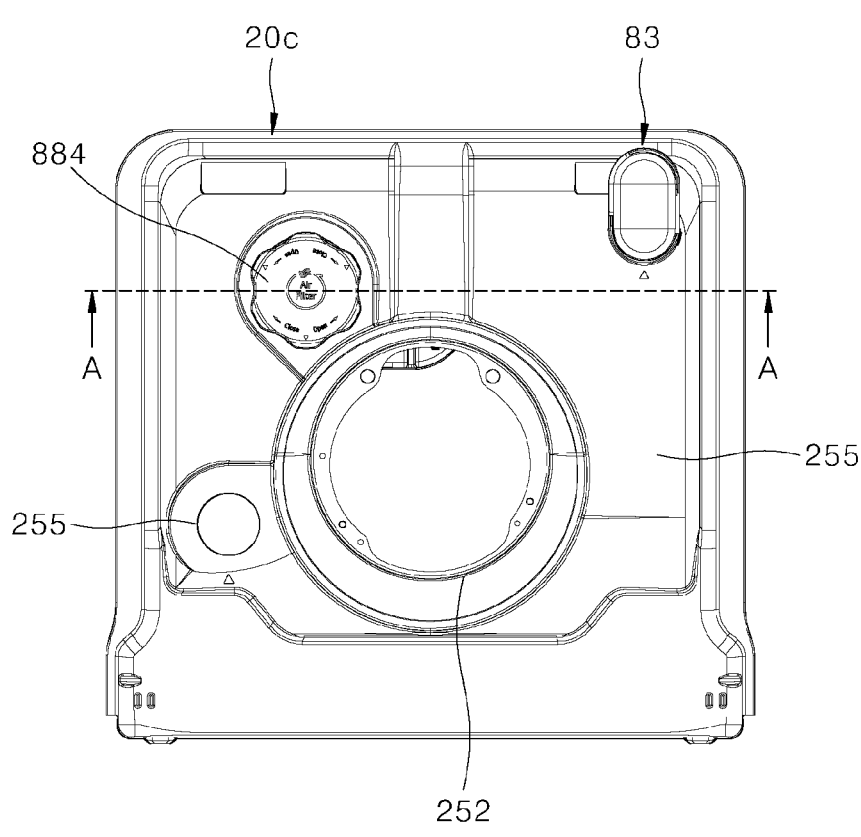
FIG. 10 is a plan view of FIG. 8.
Figure 11:
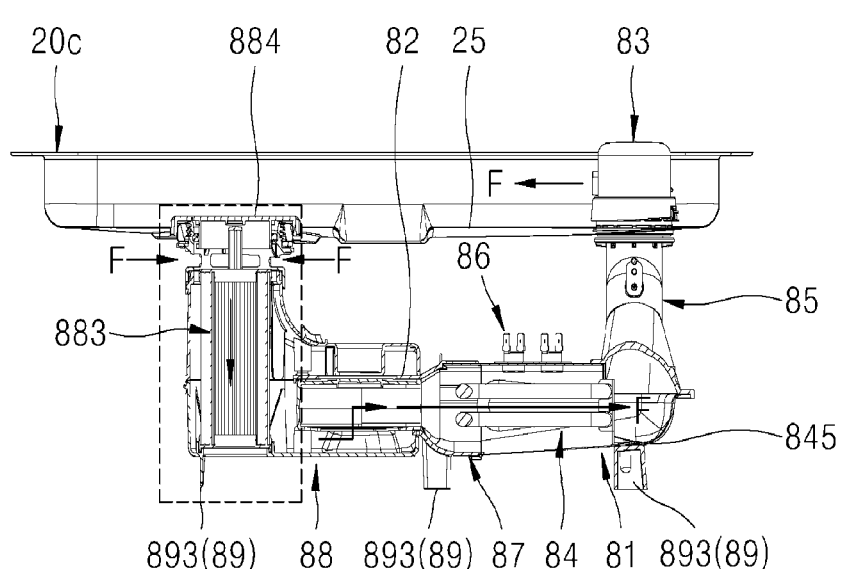
FIG. 11 is a cross-sectional view of FIG. 10 cut along A-A.

The rear end side of the heater 84 may be fixed and supported through a single heater bracket 845 disposed in the heater housing 81, as illustrated in FIG. 10. That is, the rear end side of the heater 84 may be supported on the air passage through the heater bracket 845 in the state of being separated from the heater housing 81.

Further, a temperature sensor as a temperature sensing part 86 sensing the temperature of high-temperature dry air generated through the heater 84 or detecting the overheating of the heater 84 may be provided on the upper side surface 8121*a* of the upper housing 812 of the heater housing 81.

For example, the temperature sensor may comprise a thermistor that senses the temperature of dry air, and a thermostat that detects the overheating of the heater 84.

An output signal of the temperature sensor may be delivered to a non-illustrated controller, and the controller may receive the output signal of the temperature sensor to determine the temperature of high-temperature dry air and the overheating of the heater. As the heater overheats, the controller may cut off the supply of power to the heater 84 and change the operation mode of the dry air supply part 80 from the high-temperature dry air supply mode to the low-temperature dry air supply mode.

The heater housing 81 may be formed into a hollow hole that has a vacant inner space such that the air passage, in which the above-described heater 84 and heater bracket 845 are disposed, is formed.

At this time, for dry airflow F to move, the front end portion of the heater housing 81, corresponding to the upper stream side with respect to the direction of the movement of the dry airflow F, and the rear end portion of the heater housing 81, corresponding to the lower stream side with respect to the direction of the movement of the dry airflow F, may be open at least partially.

The dry air supply part 80 may further comprise a connection duct part 85 that is coupled to an outlet, formed at the left end side of the heater housing 81 and being open in the upward direction (U-direction), and has an air passage therein.

As described above, the heater housing 81 and the air blowing fan are disposed under the lower surface 25 of the tub 20. The connection duct part 85 guides dry air being discharged from the heater housing 81 to a predetermined position, i.e., the dry air supply hole 254 formed at the tub 20.

For example, the predetermined position may be the lower surface 25 of the tub 20, and the dry air supply hole 254 into which dry airflow F guided to the connection duct part 85 is drawn may be formed at a corner of the lower surface 25 of the tub 20, which is adjacent to a rear surface 23 and a left side surface 26.

As shown in the illustrative embodiment, a duct main body 851 of the connection duct part 85 may have a shape that is capable of changing the direction of dry airflow and connecting the dry air supply hole 254 of the tub 20 and the outlet of the heater housing 81.

For example, the duct main body 851 of the connection duct part 85 may have a cylinder shape that allows of the fluid communication of a lower end portion 8512 with the outlet of the heater housing 81 and allows an upper end portion 8511 to extend in the upward direction (U-direction) and connect to the dry air supply hole 254.

The lower end portion 8512 of the duct main body 851 may be coupled the heater housing 81 in a sliding manner.

Further, considering the cross section of the rectangle-shaped outlet of the heater housing 81, the lower end portion of the duct main body 851 may have a rectangle pillar shape, and for the prevention of leakage, the upper end portion 8511 of the duct main body 851 may have a cylinder shape.

That is, the duct main body 851 may have a cylinder shape to improve the efficiency of a coupling between the upper end portion 8511 of the duct main body 851 and the dry air supply hole 254 of the tub 20 and to prevent leakage.

An airflow guide 83 may be coupled to the upper end portion 8511 of the duct main body 851 and divert the direction of dry airflow being supplied through the duct main body 851 to supply the dry airflow to the wash space.

The filtering part 88 may be disposed in the upper stream of the heater 84 with respect to the flow direction of dry airflow, to filter air to be suctioned into the air blowing fan and supply the filtered air to the heater.

Specifically, the filtering part 88 may comprise a filter member 883 that filters air to be suctioned into the air blowing fan, and a hollow hole-type filter housing 881 that has a filter accommodation space 51 in which the filter member 883 is disposed in a replaceable manner and a fan housing accommodation space S2 in which the fan housing 82 is disposed.

As illustrated in FIGS. 5 and 6, the filter housing 881 may comprise a first housing 8811 and a second housing 8812 that are disposed in the form of a segment body that is segmented with respect to the up-down direction (U-D direction), for example. At this time, the first housing 8811 may be the upper housing, and the second housing 8812 may be the lower housing.

The filter housing 881 accommodates and supports the filter member 883 and the fan housing 82 of the air blowing fan.

Accordingly, the first housing 8811 may be divided into a filter accommodation part 8811*a* and a fan housing accommodation part 8811*b* such that the first housing 8811 accommodates and supports the filter member 883 and the fan housing 82 at least partially, preferably, accommodates and supports the upper portion of the filter member 883 and the upper portion of the fan housing 82.

As illustrated, the lower surfaces of the filter accommodation part 8811*a* and the fan housing accommodation part 8811*b* of the first housing 8811 are open entirely to allow the second housing 8812 to be coupled to the lower sides of the filter accommodation part 8811*a* and the fan housing accommodation part 8811*b* of the first housing 8811.

The filter accommodation part 8811*a* may be formed further upstream than the fan housing accommodation part 8811*b* with respect to the flow direction of dry airflow, and in the illustrative embodiment, formed on the right of the fan housing accommodation part 8811*b*.

The filter accommodation part 8811*a,* for example, may have an outer shape of a partial cylinder to accommodate the filter member 883 having a cylinder shape in a way that the filter member 883 may be inserted and withdrawn when the filter member 883 is replaced.

Additionally, a filter guide rib 8811 may be integrally provided in the filter accommodation part 8811*a* and have a shape similar to that of a filter guide rib 8812*f* of the second housing 8812 described hereafter.

The filter accommodation part 8811*a* may have a coupling opening 8811*c* at the upper end thereof, and the coupling opening 8811*c* is open in the form of a circle, to correspond to the outer shape of the filter member 883. The filter member 883 may move downward through the coupling opening 8811*c,* and move to a filter accommodation part 8812*a* of the second housing 8812. The coupling opening 8811*c* may be provided with a protruding surface 8811*j* (FIG. 21) that protrudes toward the filter accommodation space S1. In the state where the filter member 883 is disposed in the filter accommodation space S1, the protruding surface 8811*j* surface-contacts and joins the upper end side of the filter member 883 in a way that the protruding surface 8811*j* pressurizes an outer circumferential surface 8832 of the upper end side of the filter member 883 directly.

The fan housing accommodation part 8811*b* may be formed further downstream than the filter accommodation part 8811*a* with respect to the flow direction of dry airflow, and in the illustrative embodiment, formed integrally at the filter accommodation part 8811*a*, on the right of the filter accommodation part 8811*a*, near the heater housing 81.

The fan housing accommodation part 8811*b* may have an inner shape corresponding to the outer shape of the upper portion of the fan housing 82, to cover the upper portion of the air blowing fan entirely. For example, the fan housing accommodation part 8811*b* may have an upper surface formed into a flat plate.

However, a vent hole 8811*f* may be formed in the central portion of the upper surface of the fan housing accommodation part 8811*b*, to expose the fan housing 82's upper surface 821 area, where the PCB substrate is disposed, to the outside at least partially, thereby cooling the above-described PCB substrate and motor of the air blowing fan. A hollow hole cylinder-type vent duct 8811*g* may be formed under the vent hole 8811*f* and extend toward the upper surface 821 of the fan housing 82.

Additionally, a drain channel 8811*h* formed into a slit may be provided on the upper surface of the fan housing accommodation part 8811*b*, and one end portion of the drain channel 8811*h* connects to the lower end of the vent duct 8811*g*, and the other end portion of the drain channel 8811*h* extends to the front surface of the first housing 8811. By doing so, wash water drawn into the vent hole 8811*f* may move through the drain channel 8811*h* and be discharged toward the base 90.

As illustrated, the upper surface of the first housing 8811 may have an inclined surface 8811*b*1 that connects the upper end of the filter accommodation part 8811*a* and the fan housing accommodation part 8811*b*. The drain channel 8811*h* discharges wash water that leaks from the upper end of the filter accommodation part 8811*a* and then is drawn into the vent duct 8811*g* along the inclined surface.

As a means of minimizing the flow of wash water, moving along the inclined surface, into the vent duct, a blocking rib may be integrally provided on the upper surface of the first housing. The blocking rib, for example, may comprise a first blocking rib 8811*i*1 provided on the upper side surface of the fan housing accommodation part 8811*b*, and a second blocking rib 8811*i*2 provided on the inclined surface 8811*b*1. The first blocking rib 8811*i*1 may extend along the front-rear direction, in a line shape, and the second blocking rib 8811*i*2 may extend along the front-rear direction in a curved line shape. A detailed configuration of the first blocking rib 8811*i*1 is described hereafter, with reference to FIGS. 24 and 25.

Additionally, a pair of guide bosses 8811*e* may be provided in the first housing 8811 and protrude toward the fan housing 82 from the upper surface of the first housing 8811. Each of the guide bosses 8811*e* protrudes toward the above-described connection tab 872 of the housing connector 87, and joins each of the pair of fastening bosses 873 provided at the connection tab 872.

Further, the left side surface of the fan housing accommodation part 8811*b* of the first housing 8811 is partially open and form a portion of a housing connector coupling hole 881*a*. The remaining portion of the housing connector coupling hole 881*a* may be formed on the left side surface of a fan housing accommodation part 8812*b* of the second housing 8812 described hereafter.

The connector main body 871 of the housing connector 87 may be inserted into the filter housing 881 at least partially through the housing connector coupling hole 881*a*. To this end, the shape of the housing connector coupling hole 881*a* may correspond to the outer shape of the connector main body 871.

The second housing 8812 of the filter housing 881 is coupled to the lower portion of the first housing 8811 and forms a sealed accommodation space, and accommodates and supports the lower portions of the filter member 883 and the fan housing 82.

Like the first housing 8811, the second housing 8812 may be divided into a filter accommodation part 8812*a* and a fan housing accommodation part 8812*b*, to accommodate and support the lower portion of the filter member 883 and the lower portion of the fan housing 82.

As illustrated, the upper end of the second housing 8812 may be open entirely to be coupled to the lower end of the first housing 8811.

To correspond to the filter accommodation part 8811*a* of the first housing 8811, the filter accommodation part 8812*a* of the second housing 8812, provided under the filter accommodation part 8811*a* of the first housing 8811, may be provided with a plurality of filter guide ribs 8812*f* that guides the filter member 883's movement and prevents the filter member 883's escape from the right position at a time of inserting the filter member 883.

The filter guide rib 8812*f* may protrude upward from a bottom surface 8812*e* of the filter accommodation part 8812*a*, and its lower end may be integrally formed on the bottom surface 8812*e* of the filter accommodation part 8812*a*.

Additionally, to correspond to the filter member 883's outer shape formed into a cylinder, the plurality of filter guide ribs 8812*f* may be arranged and disposed in a radial shape around the filter member 883. A detailed configuration of the filter guide rib 8812*f* is described hereafter with reference to FIGS. 21 to 23.

As the center of the plurality of filter guide ribs 8812*f*, a lower suction opening 8812*c* may be formed on the bottom surface 8812*e* of the filter accommodation part 8812*a* in a penetrating manner, and be open toward the lower surface of the base 90 and allows external air to be drawn.

The lower suction opening 8812*c* may have a circle shape to correspond to the shape of a lower opening of the filter member 883 having a cylinder shape, and a relative position and size of the lower suction opening 8812*c* may be determined to allow external air to pass through the lower opening and to be smoothly suctioned into the filter member 883.

Additionally, as one airtight means, a pair of ring-type ribs may be formed around the lower suction opening 8812*c* of the bottom surface 8812*e* of the second housing 8812, and prevent non-filtered external air from being leaked and suctioned into the inner space of the filter housing 881 directly.

The fan housing accommodation part 8812*b* may be formed further downstream than the filter accommodation part 8812*a* with respect to the flow direction of dry airflow, and in the illustrative embodiment, formed integrally at the filter accommodation part 8812*a*, on the right of the filter accommodation part 8812*a*, near the heater housing 81.

The fan housing accommodation part 8811*b* may have an inner shape corresponding to the outer shape of the lower portion of the fan housing 82, to cover the lower portion of the air blowing fan entirely.

The bottom surface 8812*e* of the fan housing accommodation part 8811*b* may be spaced a predetermined distance apart from the lower surface 824 of the fan housing 82, to allow filtered air to be suctioned effectively, and for example, be formed into a flat surface in a direction parallel with the horizontal direction.

As a means of spacing the fan housing 82 apart from the bottom surface 8812*e* of the fan housing accommodation part 8811*b* and supporting the fan housing 82, a plurality of uplifted surface parts 8812*e*3 and a screw boss 8812*e*2 that protrude from the bottom surface 8812*e* may be provided in the fan housing accommodation part 8812*b*.

The plurality of uplifted surface parts 8812*e*3 is provided to avoid another structure disposed under the second housing 8812, and for example, provided to avoid the base's ribs and leakage detecting part disposed under the second housing 8812.

Accordingly, the shape of an individual uplifted surface part 8812*e*3 may vary depending on the shape of another avoided structure.

The plurality of uplifted surface parts 8812*e*3 may be used as a support part that supports the fan housing 82 in the state of being spaced from the bottom surface of the fan housing accommodation part 8811*b*. Thus, the air blowing fan may be disposed such that the lower surface 824 of the fan housing 82 surface-contacts the upper end surface of an individual uplifted surface part 8812*e*3.

Further, the plurality of uplifted surface parts 8812*e*3 may function as a stopper that prevents the filter housing 881 from moving relative to the base 90 in the front-rear direction.

The screw boss 8812*e*2 supports the lower surface 824 of the fan housing 82 together with an individual uplifted surface part 8812*e*3. Additionally, the screw boss 8812*e*2 may be provided with a bolt hole 8812*e*1 into which one of the pair of screw bolts fastening the fan housing 82 and the connection tab 872 of the housing connector 87 at the same time is inserted.

The other remaining bolt hole 8812*e*1 may be formed at any one of the plurality of uplifted surface parts 8812*e*3 in a penetrating manner.

In the first housing 8811 and the second housing 8812 that are disposed in the form of a segment body as described above, the lower end of the first housing 8811 and the upper end of the second housing 8812 may be detachably coupled to each other.

To achieve the above-described detachable coupling relationship, a fastening tab 8811*d* extending toward the second housing 8812 is provided at the lower end of the first housing 8811, and a hook projection 8812*d* may be provided at the upper end of the second housing 8812 and fastened to the fastening tab 8811*d* based on a hook coupling.

A tub connection duct 882 may be detachably coupled and fastened to the coupling opening 8811*c* of the filter accommodation part 8811*a* of the first housing 8811.

The filter member 883 of the filtering part 88 of one embodiment may be replaced through the lower surface 25 of the tub 20.

To this end, the filter accommodation part 8811*a* of the first housing 8811 needs to connect to the lower surface 25 of the tub 20, and the tub connection duct 882 connects the lower surface 25 of the tub 20 and the filter accommodation part 8811*a* of the first housing 8811.

The tub connection duct 882 may be integrally provided at the filter accommodation part 8811*a* of the first housing

8811. Hereafter, the tub connection duct 882 that is additionally provided in the first housing 8811, as illustrated, is described.

Like the duct main body 851 of the above-described connection duct part 85, an upper end portion 8821 of the tub connection duct 882 may pass through the lower surface 25 of the tub 20 and extend upward.

A filter replacement hole 253 may be provided on the lower surface 25 of the tub 20 to allow the upper end portion 8821 of the tub connection duct 882 to come in, as illustrated in FIGS. 7 and 8.

A sump hole 252 on which a sump 41 is mounted may be provided in the central portion of the lower surface 25 of the tub 20. The lower surface 25 of the tub 20 may have a convergence surface having an inclination angle at which the convergence surface gradually inclines downward toward the sump hole 252, to allow wash water to be effectively converged on the sump hole 252.

As illustrated, the filter replacement hole 253 may be formed on the convergence surface, at the rear of the sump hole 252.

To distinguish the filter replacement hole 253 from the dry air supply hole 254, the filter replacement hole 253 may be formed at the corner adjacent to the rear surface and the right side surface, on the lower surface 25 of the tub 20. Additionally, to easily insert and withdraw the filter member 883 for replacement, the filter replacement hole 253 may be disposed closer to the front surface of the tub 20 than the dry air supply hole 254 and disposed further rearward than a water softener communication hole 255.

The water softener communication hole 255 formed in front of the filter replacement hole 253, for example, may be used to insert a water softening agent into a water softener provided under the water softener communication hole 255, and the like, or used for the replacement and maintenance and repairs of another component such as a purification filter of a water supply part, and the like.

The filter replacement hole 253 may be disposed between the water softener communication hole 255 and the dry air supply hole 254 with respect to the front-rear direction or the left-right direction.

That is, the filter replacement hole 253 may be disposed outside a virtual extension line that connects the water softener communication hole 255 and the dry air supply hole 254.

By doing so, even if the lower surface 25 of the tub 20 has a plurality of openings, the strength, torsional rigidity and flexural rigidity of the tub 20 may not decrease.

Additionally, to distinguish the filter replacement hole 253 from the water softener communication hole 255 formed in front of the filter replacement hole 253, a sealing cap 884 having a different shape or color from the water softener communication hole 255 may be applied at the upper end of the tub connection duct 882 that passes through the filter replacement hole 253 and is exposed to the wash space.

To improve coupling efficiency and prevent leakage between the upper end portion 8821 of the tub connection duct 882 and the filter replacement hole 253 of the tub 20, the tub connection duct 882 may be formed into a cylinder.

As a means of improving coupling efficiency and preventing leakage, a ring-type flange 8823 and a male screw part 8824 may be provided at the upper end portion 8821 side of the tub connection duct 882.

The upper end portion 8821 of the tub connection duct 882 may pass through the lower surface 25 of the tub 20 and extend in the upward direction (U-direction), and the upper end portion 8821 of the tub connection duct 882 and the male screw part 8824 may pass through the lower surface 25 of the tub 20 and protrude toward the inside of the tub 20 at least partially.

As described above, the filter replacement hole 253 is provided on the convergence surface provided on the lower surface 25 of the tub 20. Thus, the tub connection duct 882's upper end portion 8821 and flange 8823 coupled to the filter replacement hole 253 may have a predetermined inclination angle with respect to the perpendicular direction, to correspond to the inclination angle of the convergence surface of the tub 20, i.e., may be formed to incline with respect to the perpendicular direction.

A fastening nut 886 may be coupled to the male screw part 8824 that is disposed by passing through the tub 20.

At a time of fixing and fastening the tub connection duct 882, the fastening nut 885 is screw-coupled to the male screw part 8824, in the tub 20. Accordingly, the upper end portion 8821 of the tub connection duct 882 may be fixed in the state of being exposed to the inside of the tub 20. A first gasket 885 may be further provided between the flange 8823 and the lower surface 25 of the tub 20 to prevent the fastening nut 886 from loosening and prevent leakage.

As the tub connection duct 882 is fixed to the lower surface 25 of the tub 20 through the fastening nut 886, the sealing cap 884 may be coupled to the upper end portion 8821 of the tub connection duct 882 exposed to the inside of the tub 20. At this time, an airtight ring 887 for preventing water leakage may be disposed between the sealing cap 884 and the upper end portion 8821 of the tub connection duct 882.

Additionally, an upper suction opening 8826 into which external air is drawn may be formed in a position under the flange 8823, corresponding to the upper side of the filter accommodation space S1, between the upper end portion 8821 and a lower end portion 8822 of the tub connection duct 882, in a penetrating manner.

The upper suction opening 8826 may be formed in a way that penetrates the cylinder-type tub connection duct 882 from the inner circumferential surface thereof to the outer circumferential surface thereof. For example, the upper suction opening 8826 may be provided as a plurality of penetration openings arranged and formed along the circumferential direction of the tub connection duct 882.

Since the upper suction opening 8826 is formed along the circumferential direction of the tub connection duct 882 that extends approximately perpendicularly, the upper suction opening 8826 is open approximately horizontally. External air suctioned into the upper suction opening 8826 forms airflow having directionality approximately parallel with the horizontal direction.

At this time, to prevent a reduction in strength of the tub connection duct 882, the upper suction opening 8826 provided as a plurality of penetration openings may be formed into a slit having an up-down height less than a circumferential width.

Further, each of the plurality of penetration openings constituting the upper suction opening 8826 may have the same open surface area, to allow external air to be suctioned evenly along the circumferential direction.

The upper suction opening 8826 may be formed higher than an upper opening of the filter member 883, in the state where the filter member 883 is disposed in the filter accommodation space S1. Accordingly, the upper suction opening 8826 may be formed between the tub 20 and an upper surface 8835 of the filter member 883 with respect to the up-down direction.

After external air having passed through the upper suction opening 8826 in a direction parallel with the horizontal direction may enter into the filter member 883, the direction of the airflow changes, and the external air may be filtered while passing through the outer circumferential surface 8832 of the filter member 883.

That is, in the filtering part 88 according to the present disclosure, external air may flow into the filter member 883 through two suction paths comprising the lower suction opening 8812c and the upper suction opening 8826 that are spaced from each other along the up-down direction. By doing so, a sufficient flow rate of dry airflow F required to dry a wash target may be ensured effectively.

The suction path of external air and the flow path of dry airflow having passed through the filter member are described hereafter with reference to FIG. 10.

Further, a fastening part 8825 for providing a detachably fastening function to the coupling opening 8811c of the first housing 8811 may be integrally provided in the lower end portion 8822 of the tub connection duct 882. For example, the fastening part 8825 may be a fastening means that is coupled to the coupling opening 8811c of the first housing 8811 based on a hook coupling.

[Airflow Path Before and After Filtering]

Hereafter, the flow path of external air before the external air passes through the filter member 883 of the dishwasher 1 of one embodiment, and the flow path of dry airflow F after external air passes through the filter member 883 and is filtered are described with reference to FIG. 10.

The first housing 8811 and the second housing 8812 of the filter housing 881 of the dishwasher 1 of one embodiment are spaced from each other in the up-down direction, and in the filter housing 881, external air is suctioned through a plurality of suction openings that are open toward a space between the base 90 and the tub 20.

As described above, the plurality of suction openings may comprise the upper suction opening 8826 provided at the tub connection duct 882, at the upper side of the filter accommodation space S1, and the lower suction opening 8812c provided on the bottom surface 8812e of the second housing 8812, at the lower side of the filter accommodation space S1.

As described above, the upper suction opening 8826 and the lower suction opening 8812c are spaced from each other and disposed respectively in the uppermost position and the lowermost position of the filter housing 881 with respect to the space between the tub 20 and the base 90. Accordingly, in the state where the effect of the flow rate of air suctioned respectively into the upper suction opening and the lower suction opening is minimized, external air may flow into the filter housing 881 through the two suction inlets, thereby ensuring more flow rate of air required to dry a wash target and spending less time drying a wash target than usual.

As illustrated, the upper suction opening 8826 is open in a direction approximately parallel with the horizontal direction. Accordingly, external air suctioned into the upper suction opening 8826 forms airflow of a direction parallel with the horizontal direction.

The lower suction opening 8812c is formed on the bottom surface 8812e that extends horizontally. Accordingly, the lower suction opening 8812c is open toward the base 90 in a direction parallel with the perpendicular direction, and external air suctioned into the lower suction opening 8812c forms airflow of a direction parallel with the perpendicular direction.

External air suctioned through the upper suction opening 8826 may enter into the upper opening of the filter member 883 disposed right under the upper suction opening 8826 in the state where the filter member 883 is disposed in the filter accommodation space S1.

Additionally, external air suctioned through the lower suction opening 8812c may enter into the lower opening of the filter member 883 disposed right on the lower suction opening 8812c in the state where the filter member 883 is disposed in the filter accommodation space S1.

In the state where the filter member 883 is disposed, an airtight means of preventing non-filtered air from being suctioned into the filter housing 881 may be provided at the upper end side and the lower end side of the filter member 883. The airtight means may comprise a second gasket 8852 fixed to the coupling opening 8811c of the first housing 8811, and a pair of ring-type ribs 8812g provided around the lower suction opening 8812c of the second housing.

Thus, external air suctioned into the upper suction opening 8826 and the lower suction opening 8812c may enter respectively into the upper opening and the lower opening of the filter member 883, without leaking.

Further, in the state where the filter member 883 is disposed in the filter accommodation space S1, the upper opening of the filter member 883 is open toward the lower surface 25 of the tub 20, and the lower opening of the filter member 883 is open toward the lower surface of the base 90. Accordingly, the direction of airflow of external air changes to the downward direction while passing through the upper opening, and external air having passed through the lower opening flows upward.

As described above, external air suctioned into the filter member 883 may pass through the filtering material of the filter member 883 and be evenly suctioned entirely in the up-down direction and circumferential direction.

Further, external air suctioned into an inner circumferential surface 8831 of the filter member 883 is filtered, and while passing through the outer circumferential surface 8832 of the filter member 883, is discharged, and immediately after the discharge, the flow direction of the external air changes.

As illustrated in FIG. 10, the flow direction of the filtered air having passed through the outer circumferential surface 8832 of the filter member 883 may change toward the lower surface 824 of the fan housing 82 that is open toward the bottom surface 8812e of the filter housing 881.

The lower surface 824 of the fan housing 82 is disposed in a position spaced upward from the bottom surface 8812e, between the lower end and the upper end of the filter member 883. Accordingly, air, having passed through the filter member 883 in a position higher than the lower surface 824 of the fan housing 82, flows downward to the lower surface 824 of the fan housing 82, and air, having passed through the filter member 883 in a position lower than the lower surface 824 of the fan housing 82, flows upward to the lower surface 824 of the fan housing 82.

Filtered air drawn into the fan housing 82 through the above-described flow path is accelerated by a fan and then drawn into the housing connector 87 and the inner space of the heater housing 81 through an exhaust duct 822, such that dry airflow F is formed.

[Detailed Configuration of Filter Member]

Hereafter, the filter member 883 of the dishwasher 1 of one embodiment is described with reference to FIGS. 10 to 13.

As illustrated, the filter member 883 may comprise an upper cover 8832 having an upper opening 8832c which is formed at the center of the upper cover 8832 in a penetrating manner and into which air to be filtered is drawn, a lower cover 8833 being spaced downward from the upper cover 8832 and having a lower opening 8833c which is formed at the center of the lower surface of the lower cover 8833 in a penetrating manner and into which air to be filtered is drawn, and a filter material 8831 being disposed between the upper cover 8832 and the lower cover 8833 and filtering air drawn into the upper opening 8832c and the lower opening 8833c.

The upper cover 8832 is coupled to the upper end of the filter material 8831 disposed in a cylindrical shape, and protects the upper end of the filter material 8831.

To this end, the upper cover 8832 may be manufactured in a way that a plastic material having a higher rigidity than the filter material 8831 is injection-molded.

Specifically, the upper cover 8832 may comprise a circular plate part 8832e having a shape corresponding to the shape of the upper end surface of the filter material 8831 that is disposed in a cylindrical shape.

The circular plate part 8832e may be blocked entirely, except for the upper opening 8832c formed at the center thereof, to prevent the leakage of filtered air and prevent non-filtered air from flowing into the filter housing 881, while protecting the upper end of the filter material 8831 effectively.

Additionally, an outer cylinder part 8832a may be provided at the radial outer side edge of the circular plate part 8832e, and inner cylinder part 8832b may be provided under the central portion of the circular plate part 8832e.

At this time, the lower end of the outer cylinder part 8832a and the lower end of the inner cylinder part 8832b extend downward from the circular plate part 8832e.

By doing so, the outer cylinder part 8832a may be disposed in a way that at least partially surrounds the outer circumferential surface of the upper end of the cylinder-shaped filter material 8831, and the inner cylinder part 8832b may be disposed in a way that at least partially surrounds the inner circumferential surface of the upper end of the cylinder-shaped filter material 8831.

By doing so, a contact surface between the upper cover 8832 and the upper end side of the filter material 8831 may expand effectively, and a coupling force between the upper cover 8832 and the upper end side of the filter material 8831 may improve.

Further, as a means of expanding the contact surface between the upper cover 8832 and the filter material 8831, a ring-type projection 8832d may be provided on the upper surface of the circular plate part 8832e contacting the upper end surface of the filter material 8831.

As illustrated, the inner circumferential surface of the inner cylinder part 8832b of the upper cover 8832, disposed at the center of the circular plate part 8832e, functions as an upper opening 8832c that serves as a first inlet of air to be drawn into the filter material 8831.

The lower cover 8833 is coupled to the lower end of the filter material 8831 disposed in a cylindrical shape, and protects the lower end of the filter material 8831.

To this end, like the upper cover 8832, the lower cover 8833 may be manufactured in a way that a plastic material having a higher rigidity than the filter material 8831 is injection-molded. For example, the lower cover 8833 and the upper cover 8832 may be made of the same plastic material.

The lower cover 8833 may be provided with a circular plate part 8833e having a shape that corresponds to the shape of the lower end surface of the filter material 8831 disposed in a cylindrical shape.

The circular plate part 8833e may be blocked entirely except for the lower opening 8833c formed at the center thereof, to prevent the leakage of air to be filtered, while protecting the lower end of the filter material 8831 effectively.

Like the upper cover 8832, an outer cylinder part 8833a may be provided at the radial outer side edge of the circular plate part 8833e, and an inner cylinder part 8833b may be provided on the central portion of the circular plate part 8833e.

As illustrated, the upper end of the outer cylinder part 8833a and the upper end of the inner cylinder part 8833b of the lower cover 8833 extend upward from the circular plate part 8833e.

Thus, the outer cylinder part 8833a may be disposed in a way that at least partially surrounds the outer circumferential surface of the lower end of the cylinder-shaped filter material 8831, and the inner cylinder part 8833b may be disposed in a way that at least partially surrounds the inner circumferential surface of the lower end potion of the cylinder-shaped filter material 8831.

By doing so, a contact surface between the lower cover 8833 and the lower end side of the filter material 8831 may expand effectively, and a coupling force between the lower cover 8833 and the lower end side of the filter material 8831 may improve.

Further, as a means of expanding the contact surface between the lower cover 8833 and the lower end side of the filter material 8831, a ring-type projection 8833d may be provided on the upper surface of the circular plate part 8833e of the lower cover 8833 contacting the lower end surface of the filter material 8831.

As illustrated, the inner circumferential surface of the inner cylinder part 8833b, disposed at the center of the circular plate part 8833e of the lower cover 8833, functions as a lower opening 8833c that serves as a second inlet of air to be drawn into the filter material 8831.

Further, unlike the upper cover 8832, the lower end of the outer cylinder part 8833a of the lower cover 8833 may protrude further downward than the lower surface of the circular plate part 8833e.

As illustrated, the lower end of the outer cylinder part 8833a of the lower cover 8833 may protrude further downward than lower surface of the circular plate part 8833e with respect to the up-down direction.

The lower end of the outer cylinder part 8833a of the lower cover 8833, which protrudes downward from the circular plate part 8833e as described above, is inserted between the pair of ring-type ribs 8812g formed around the lower suction opening 8812c of the second housing of the filter housing 881.

That is, the lower end of the outer cylinder part 8833a of the lower cover 8833 and the pair of ring-type ribs 8812g serve as one of the airtight means of preventing non-filtered air from flowing into the filter housing 881.

Figure 18:
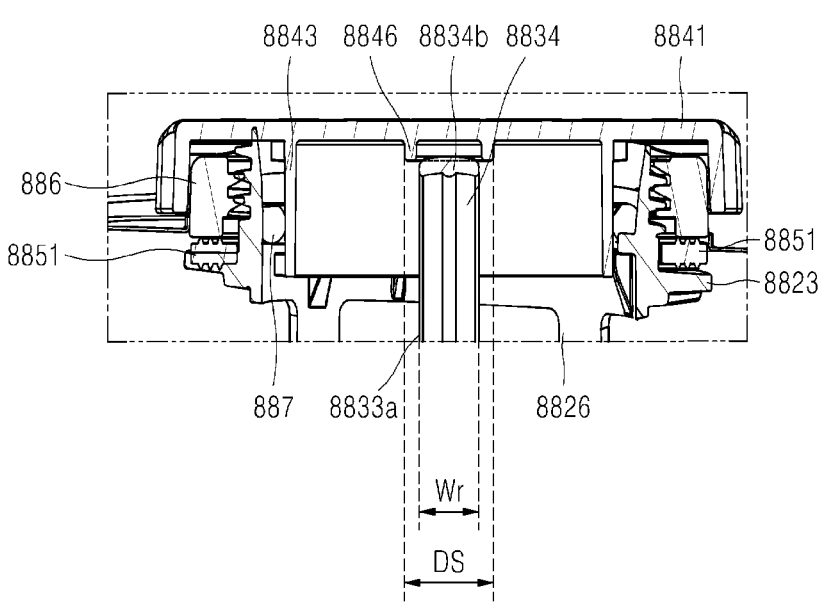

Specifically, referring to FIG. 18, the lower end of the outer cylinder part 8833a is inserted between the pair of ring-type ribs 8812g described above in the state where the filter member 883 is completely disposed in the filter housing 881.

At this time, at least one of the inner circumferential surface and the outer circumferential surface of the lower end portion of the outer cylinder part 8833a may surface-contact a first ring-type rib 8812g1 or a second ring-type rib 8812g2.

That is, the inner circumferential surface of the lower end portion of the outer cylinder part 8833a may surface-contact the outer circumferential surface of the first ring-type rib 8812g1, or the outer circumferential surface of the lower end portion of the outer cylinder part 8833a may surface-contact the inner circumferential surface of the second ring-type rib 8812g2.

By doing so, a space between the first ring-type rib 8812g1 and the second ring-type rib 8812g2 may be closed by at least any one of the inner circumferential surface and the outer circumferential surface of the lower end portion of the outer cylinder part 8833a.

Additionally, the lower end of the outer cylinder part 8833a may contact the filter accommodation part 8812a's bottom surface 8812e that is formed between the first ring-type rib 8812g1 and the second ring-type rib 8812g2.

Further, the upper end of the first ring-type rib 8812g1 may contact the bottom surface of the circular plate part 8833e of the lower cover 8833.

Accordingly, a flow path of external air, which may be formed between the first ring-type rib 8812g1 and the second ring-type rib 8812g2, may be blocked effectively, and external air having passed through the lower suction opening 8812c may be drawn into the lower opening 8833c formed at the circular plate part 8833e of the lower cover 8833, without leaking. Thus, deterioration of the filtering efficiency of the filter member 883 may be prevented.

Figure 12:
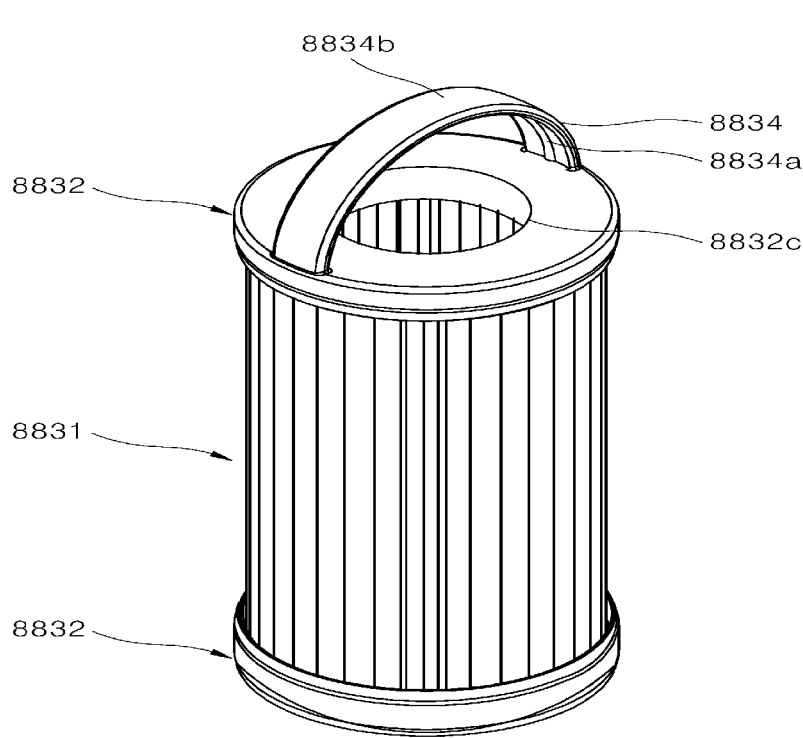
FIG. 12 is a perspective view showing the filter member in FIGS. 5 to 7.

Further, as illustrated in FIG. 12, the inner diameter of the outer cylinder part 8832a of the upper cover 8832 and the inner diameter of the outer cylinder part 8833a of the lower cover 8833 may be approximately the same. At this time, the inner diameter of the outer cylinder part 8832a of the upper cover 8832 and the inner diameter of the outer cylinder part 8833a of the lower cover 8833 may be greater than or the same as the outer diameter of the filter material 8831.

Further, the outer diameter of the outer cylinder part 8832a of the upper cover 8832 and the outer diameter of the outer cylinder part 8833a of the lower cover 8833 may be approximately the same. At this time, as illustrated in FIG. 12, the outer diameter Dc1 of the outer cylinder part 8832a of the upper cover 8832 and the outer diameter Dc1 of the outer cylinder part 8833a of the lower cover 8833 may be less than the inner diameter Dh of the coupling opening 8811c of the filter housing 881.

As a result, at a time of inserting and withdrawing the filter member 883, movement resistance against the coupling opening 8811c of the filter housing 881 may be minimized, and damage or destruction to the filter member 883, caused by the coupling opening 8811c of the filter housing 881, may be prevented.

However, since the outer diameter Dc1 of the outer cylinder part 8832a of the upper cover 8832 is less than the inner diameter Dh of the coupling opening 8811c of the filter housing 881 as described above, a predetermined separation space is formed between the outer cylinder part 8832a of the upper cover 8832 and the inner diameter of the coupling opening 8811c in the state where the filter member 883 is disposed in the filter housing 881.

Accordingly, non-filtered air may flow into the filter housing 881 through the separation space, and as the non-filtered air flows into the wash space of the tub, contaminate wash targets.

As an airtight means of preventing the contamination of wash targets through non-filtered air, the dishwasher of one embodiment may further comprise a second gasket 8852 that is fixed to the coupling opening 8811c to close a separation space formed between the coupling opening 8811c and the upper cover 8832 of the filter housing 881.

As illustrated in FIG. 12, the second gasket 8852 may comprise a coupling part 8852a having a cylinder shape, and a blocking part 8852b integrally connecting to the upper end of the coupling part 8852a, for example.

At this time, the coupling part 8852a and the blocking part 8852b may be integrally made of an elastic material having predetermined elasticity, e.g., natural rubber or synthetic rubber.

The cylinder-shaped coupling part 8852a is coupled and fixed to the outer circumferential surface of the upper end portion of the second housing 8812, on which the coupling opening 8811c is formed. Hereafter, the upper end portion of the second housing 8812 may refer to a portion from an upper end to a portion that extends downward, i.e., the portion where the tub connection duct 882 is coupled to the second housing 8812, but not limited.

The coupling part 8852a, as illustrated, may be fixed while being fit-coupled to the outer circumferential surface of the upper end of the second housing in the downward direction. At this time, during the fit-coupling process, the coupling part 8852a may be elastically deformed in a way that its inner diameter Dg1 and outer diameter extend. By doing so, the coupling part 8852a may be elastically coupled to the outer circumferential surface of the upper end of the second housing.

For the coupling part 8852a to be elastically deformed and coupled to the outer circumferential surface of the upper end of the second housing 8812, the coupling part 8852a may be formed to have an inner diameter Dg1 less than the outer diameter of the outer circumferential surface of the upper end of the second housing, prior to its coupling.

Additionally, the blocking part 8852b covers the upper end of the second housing 8812, specifically, covers the coupling opening 8811c, formed at the upper end of the second housing 8812, directly and partially and closes the above-described separation space.

To this end, the blocking part 8852b may be formed into a circular plate the up-down thickness tg2 of which approximately remains constant and which has an open hole therein.

To close the separation space effectively and entirely along the circumferential direction, the inner open hole may have an inner diameter less than the inner diameter of the coupling opening 8811c, as illustrated. Further, the inner diameter of the open hole may be less than the outer diameter of the outer cylinder part 8832a of the upper cover 8832 and the outer diameter of the outer cylinder part 8833a of the lower cover 8833.

Figure 19:
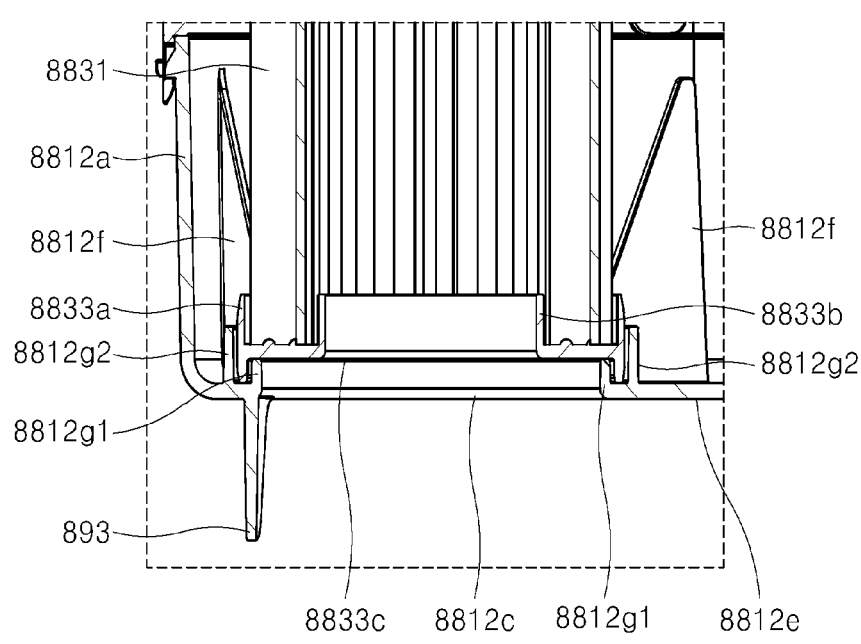
Figure 20:
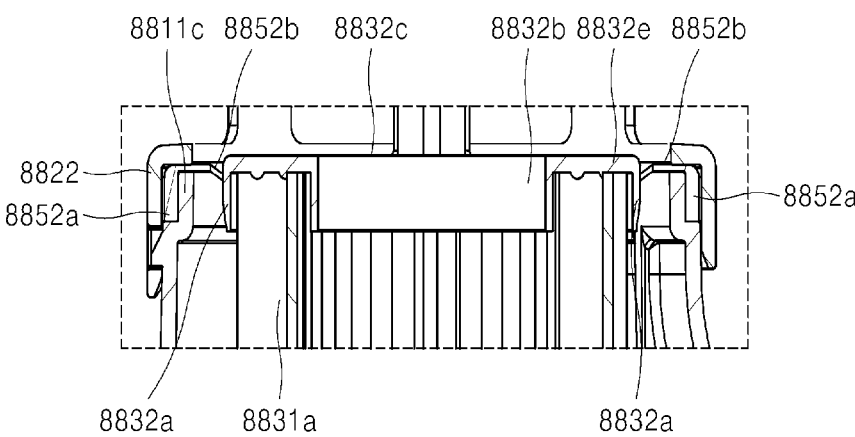

Thus, in the state where the filter housing 881 is disposed completely as illustrated in FIG. 19, the outer cylinder part 8832a of the upper cover 8832 is inserted into the open hole of the blocking part 8852b, and the blocking part 8852b is elastically deformed at least partially.

That is, before the insertion of the filter member 883, the second gasket 8852 has a shape that bends once from the coupling part 8852a toward the blocking part 8852b. However, after the insertion of the filter member 883 is completed, the second gasket 8852 has a shape that bends twice from the coupling part 8852a toward the blocking part 8852b, as the blocking part 8852b is elastically deformed. In other words, the second gasket 8852 may be deformed into an inverse U shape that covers the upper end portion of the second housing 8812.

Specifically, surroundings of the open hole of the blocking part 8852b may be elastically deformed in a way that bends partially in the downward direction, as illustrated in FIG. 19.

By doing so, the radial inner side edge of the blocking part 8852b may elastically contact the outer circumferential surface of the outer cylinder part 8832a of the upper cover 8832, and the separation space between the coupling opening 8811c and the upper cover 8832 may be closed effectively and entirely regardless of the manufacturing tolerance of the coupling opening 8811c and the manufacturing tolerance of the upper cover 8832.

However, at a time of inserting and withdrawing the filter member 883 for replacement, the blocking part 8852b and the filter material 8831 are highly likely to contact with each other and interfere with each other.

That is, during the insertion and withdrawal of the filter member 883, the radial inner side edge of the blocking part 8852b is highly likely to contact the outer side surface of a first filter material 8831a.

To minimize damage to the first filter material 8831a, caused by the contact, and insertion and withdrawal resistance, the outer diameter of the first filter material 8831a may be less than or the same as the diameter Dg2 of the open hole of the blocking part 8852b.

For the same reason, the up-down thickness tg2 of the blocking part 8852b may be less than the horizontal thickness tg1 of the coupling part 8852a, as illustrated in FIG. 12.

The filter material 8831 having a cylindrical shape may comprise a first filter material 8831a that is disposed outward in the radial direction, and a second material 8831b that is disposed inward in the radial direction with respect to the first filter material 8831a.

Figure 13:
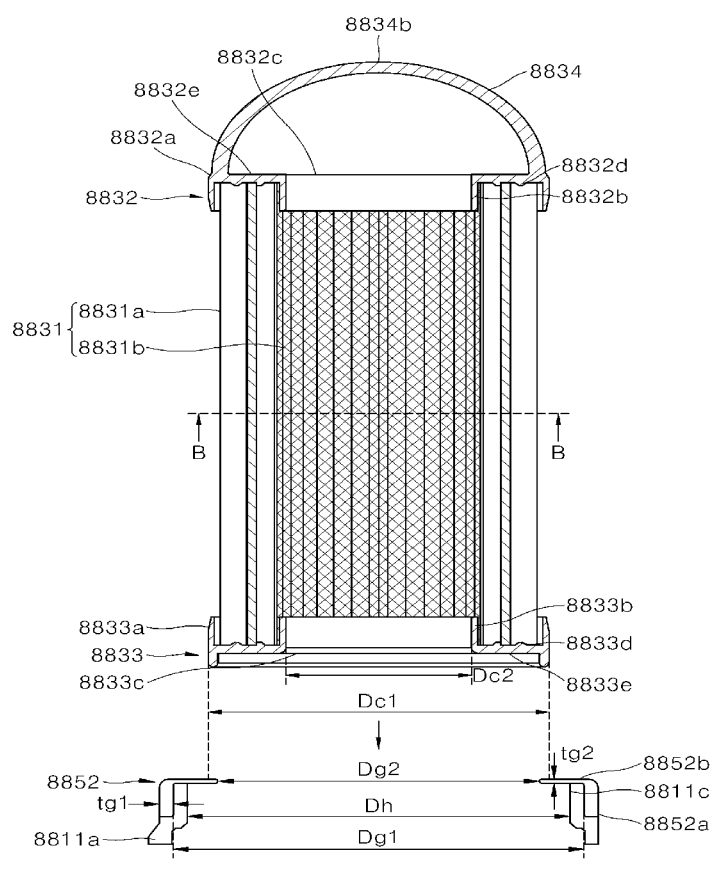
FIGS. 13 and 14 are a longitudinal cross-sectional view and a transverse cross-sectional view showing the filter member in FIG. 12.

As illustrated in FIG. 13, the first filter material 8831a may be disposed in a way that a HEPA filter having a sheet shape and a predetermined thickness are folded in a zigzag shape.

Since the first filter material 8831a is disposed in the state of being folded in a zigzag shape, as described above, a filtering surface area may be maximized, and efficiency of filtering foreign substances such as drawn dust and the like may be maximized.

The second filter material 8831b may be provided in the form of a mesh filter.

For example, the second filter material 8831b may be disposed inward, in the radial direction, with respect to the first filter material 8831a.

Accordingly, foreign substances of a relatively large size are first filtered by the second filter material 8831b in a screen filter shape, since air may be drawn first into the filter material 8831 by passing through the upper opening 8832c of the upper cover 8832 and the lower opening 8833c of the lower cover 8833.

Thus, foreign substances of a relatively large size are filtered in the state of being fixed to the second filter material 8831b, and foreign substances of a relatively small size pass through the second filter material 8831b and then be filtered in the state of being fixed to the inner side surface of the first filter material 8831a.

At this time, the filtered foreign substances on the inner side surface of the first filter material 8831a may remain in the state of being fixed between zigzag gaps. Additionally, even if the filtered foreign substances on the inner side surface of the first filter material 8831a fall downward because of gravity, the filtered foreign substances may be piled on the upper surface of the circular plate part 8833e of the lower cover 8833 without leaking out of the filter member 883. By doing so, dust may be prevented from leaking again toward the base 90 of the dishwasher 1 through the lower opening 8833c, and later, the dust may be emptied when the filter member 883 is replaced.

Additionally, since foreign substances do not remain on the outer side surface of the filter member 883, the contamination of the user's hand may be prevented fundamentally when the filter member 883 of the dishwasher according to the present disclosure is withdrawn for replacement.

The filter member 883 of the dishwasher 1 of one embodiment may further comprise a grip part that protrudes upward from the upper surface of the upper cover 8832 and extends across the upper side of the upper opening 8832c.

That is, the grip part may serve as a handle gripped by the user at a time of withdrawing and inserting the filter member 883 and protrude upward from the upper surface of the upper cover 8832.

For the grip part 8834 to be gripped easily, one end portion and the other end portion of the grip part 8834 are fixed to the upper surface of the upper cover 8832, and formed into an arch-shaped rib that has an arch shape from one end portion toward the other end portion, for example.

One end portion and the other end portion of the grip part 8834 may be spaced horizontally with the upper opening 8832c therebetween, for example. Preferably, one end portion and the other end portion of the grip part 8834 may be formed at the radial outer side edge of the circular plate part 8832e of the upper cover 8832.

Accordingly, one end portion and the other end portion of the grip part 8834 may be spaced from each other along the radial direction of the circular plate part 8832e of the upper cover 8832.

At this time, one end portion and the other end portion of the grip part 8834 may integrally connect to the upper surface of the upper cover 8832. Thus, at a time of injection-molding the upper cover 8832, the grip part 8834 may be integrally formed together with the upper cover 8832.

Further, air having passed through the upper suction opening 8826 of the tub connection duct 882 flows into the upper opening 8832c of the upper cover 8832, as described above.

Figure 16:
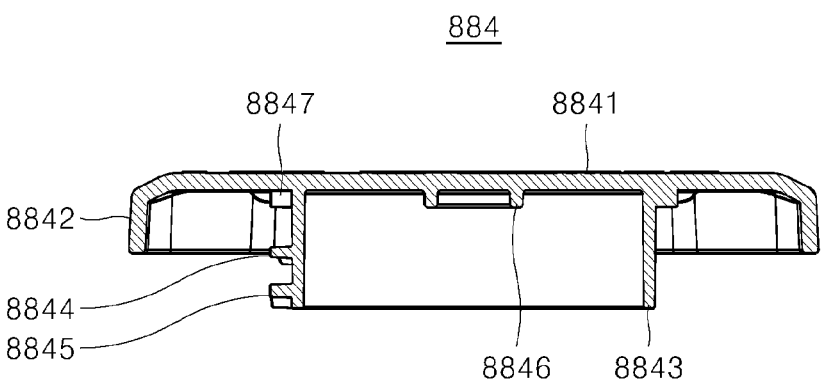
FIG. 16 is a cross-sectional view of FIG. 15.

That is, as illustrated in FIG. 16, the grip part 8834 is arranged on the flow path of air being suctioned, in the state where the grip part 8834 is disposed in the filter housing 881 completely, and air to be suctioned into the upper opening 8832c is drawn into the upper opening 8832c through a space between the grip part 8834 and the upper surface of the upper cover 8832, by passing through the grip part 8834 at least partially.

Accordingly, the grip part 8834 may act as flow resistance against the airflow of air flowing into the upper opening 8832c. To minimize flow resistance, the horizontal width Wr and thickness of the grip part 8834 may remain constant from one end portion thereof to the other end portion thereof, as illustrated.

Additionally, the upper suction opening 8826 of the tub connection duct 882 is disposed further downward than an upper end surface 8834b of the grip part 8834, constituting a grip part, with respect to the up-down direction, as illustrated. That is, the upper suction opening 8826 is disposed in a space between the grip part 8834 and the upper surface of the lower cover 8833.

Thus, as the grip part 8834 is pressurized and elastically deformed as describe hereafter, the shape of the cross section of the space between the grip part 8834 and the upper surface of the lower cover 8833 may change to a nearly rectangular shape rather than a semi-circular shape.

Further, the upper suction opening 8826 is disposed closer to the lower end of the grip part 8834 than to the upper end surface 8834b of the grip part 8834.

When the grip part 8834 is pressurized, the grip part 8834's portion connecting to the upper cover 8832 may be deformed in an almost perpendicular direction, from the upper surface of the upper cover 8832 further toward the upper cover 8832. That is, the grip part 8834 is deformed radially toward the inner circumferential surface of the tub connection duct 882 and contacts the same closely, and a space between the grip part 8834 and the upper suction opening 8826 is simplified such that the formation of turbulent flow against the airflow of drawn air is minimized, thereby ensuring improvement in the flow of air and a reduction in flow noise.

Further, the grip part 8834 may also prevent the escape of the filter member 883 in the state where the filter member 883 is arranged in the filter housing 881.

The filter member 883, as described above, may be inserted into the filter accommodation space S1 through the tub connection duct 882's upper end portion 8821 that is open.

As the insertion of the filter member 883 is completed, the open upper end portion 8821 of the tub connection duct 882 is closed by the sealing cap 884.

At this time, the upper end surface 8834b of the grip part 8834 may contact the sealing cap 884.

Specifically, a pressurizing projection 8846 may be provided in the central portion of the sealing cap 884, and protrude toward the filter accommodation space S1. The upper end surface 8834b of the grip part 8834 contacts the pressurizing projection 8846, and is pressurized downward by the pressurizing projection 8846. The pressurizing projection 8846 is also referred to as a cap projection since it protrudes for the sealing cap 884 toward the grip part 8834.

To improve the rigidity of the grip part 8834 that is pressurized by the pressurizing projection 8846, a reinforcement projection 8834a may be provided on the lower surface of the grip part 8834, and extend along the lengthwise direction of the grip part 8834.

Figure 14:
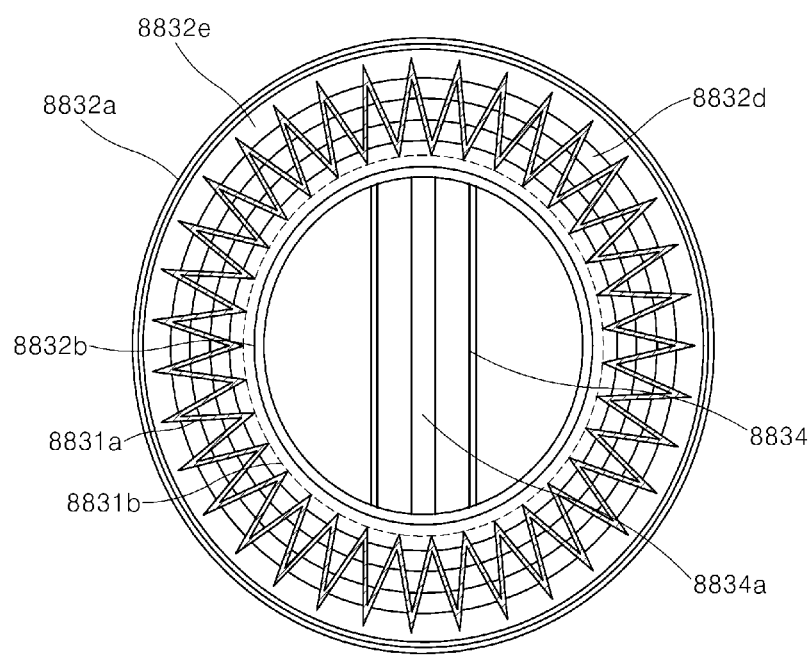
Figure 15:
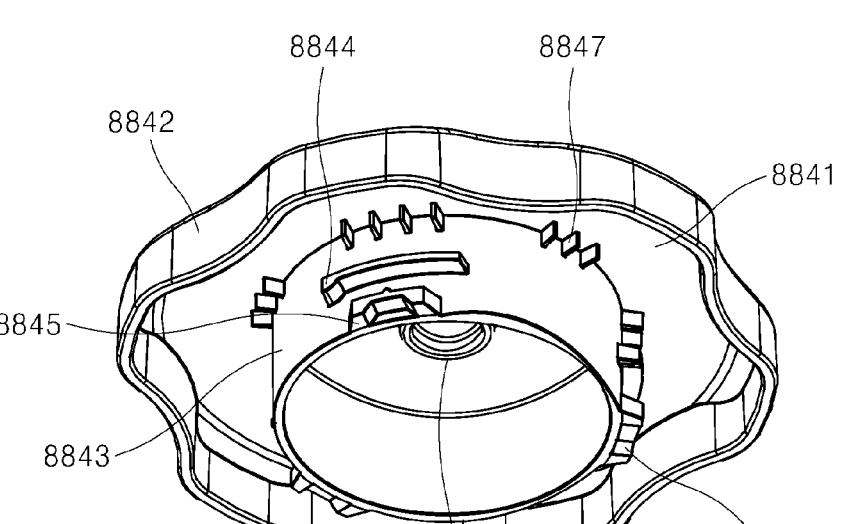
FIG. 15 is a bottom perspective view showing a sealing cap in FIGS. 5 to 7.

A detailed configuration of the sealing cap 884 provided with the pressurizing projection 8846 is illustrated in FIGS. 14 and 15.

[Detailed Configuration of Sealing Cap]

Referring to FIGS. 14 and 15, the sealing cap 884 of the dishwasher of one embodiment may comprise a pressurizing projection 8846 or a cap projection that protrudes toward the filter accommodation space S1.

As illustrated, the pressurizing projection 8846 may be a cylindrical rib that protrudes toward the filter accommodation space S1 from the lower surface of a cap main body 8841 being formed into a flat plate and having a grip groove 8842 at the radial outer side edge thereof, for example.

At this time, the cylindrical rib may be disposed in the central portion of the cap main body 8841, on the radial inside of a cylindrical sealing part 8843 that protrudes downward from the lower surface of the cap main body 8841.

The sealing cap 884 is fastened completely while rotating in one direction and unfastened while rotating in the other direction, like a sealing cap of the related art.

Accordingly, the cylindrical pressurizing projection 8846 may be arrange to share the same center with the rotation axis of the sealing cap 884 and the cylindrical sealing part 8843, such that the position of contact of the filter member 883 with the grip part 8834 remains constant, regardless of the direction of the rotation of the sealing cap.

For the same reason, the up-down position of the lower end portion of the pressurizing projection 8846 may remain constant along the circumferential direction.

Additionally, the pressurizing projection 8846, as described above, contacts the upper end surface 8834b of the grip part 8834 of the filter member 883, and pressurizes the grip part 8834 and elastically deforms the grip part 8834 at least partially.

Accordingly, the outer diameter Ds of the pressurizing projection 8846 may be greater than or the same as the horizontal width Wr of the grip part 8834 such that the pressurizing projection 8846's contact with the upper end surface 8834b of the grip part 8834 may remain stable.

Figure 17:
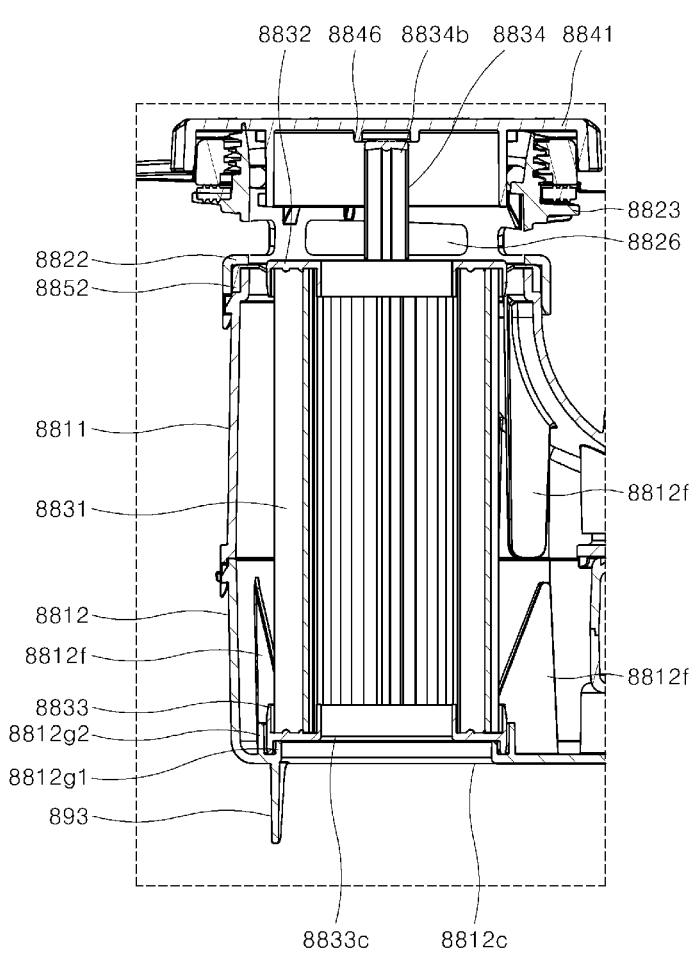
FIG. 17 is a partially enlarged view of FIG. 11, and FIGS. 18 to 20 are partially enlarged views of FIG. 17.

Further, as illustrated in FIGS. 16 and 17, the grip part 8834 of the filter member 883 is disposed in the cylindrical sealing part 8843 at least partially in the state where the sealing cap 884 is fastened, to minimize flow resistance. That is, the position of contact between the pressurizing projection 8846 and the upper end surface 8834b of the grip part 8834 may be formed further upward than the upper suction opening 8826 with respect to the up-down direction.

Thus, the height at which the pressurizing projection 8846 protrudes from the lower surface of the cap main body 8841 may be less than the height at which the cylindrical sealing part 8843 protrudes from the lower surface of the cap main body 8841.

However, the height at which the pressurizing projection 8846 protrudes from the lower surface of the cap main body 8841 may vary depending on the amounts of the pressurization and change of the grip part of the filter member 883.

Further, as illustrated in FIG. 15, a plurality of fastening projections 8844 may be arranged at regular intervals on the outer circumferential surface of the cylindrical sealing part 8843, and forms a rotation coupling to the open upper end portion 8821 of the tub connection duct 882.

Further, a plurality of stopper projections 8845 may be arranged at regular intervals on the outer side surface of the lower end of the cylindrical sealing part 8843, at the lower portion side of the fastening projection 8844, and prevents the escape of an airtight ring having an O-ring shape.

Further, a plurality of reinforcement ribs 8847 may be integrally provided at a circular edge where the cylindrical sealing part 8843 and the cap main body 8841 meet, and reinforce the cylindrical sealing part 8843.

Further, a plurality of reinforcement ribs 8847 may be integrally provided at a circular edge where the cylindrical sealing part 8843 and the cap main body 8841 meet, and reinforce the cylindrical sealing part 8843.

[Detailed Configuration of Filter Guide Rib]

Hereafter, a detailed configuration of the filter guide rib 8812f provided in the filter housing 881 is described with reference to FIGS. 21 and 23.

The filter member 883 of the dishwasher 1 of one embodiment may be disposed in a replaceable manner, in the filter accommodation space S1 of the filter housing 881, as described above.

Figure 21:
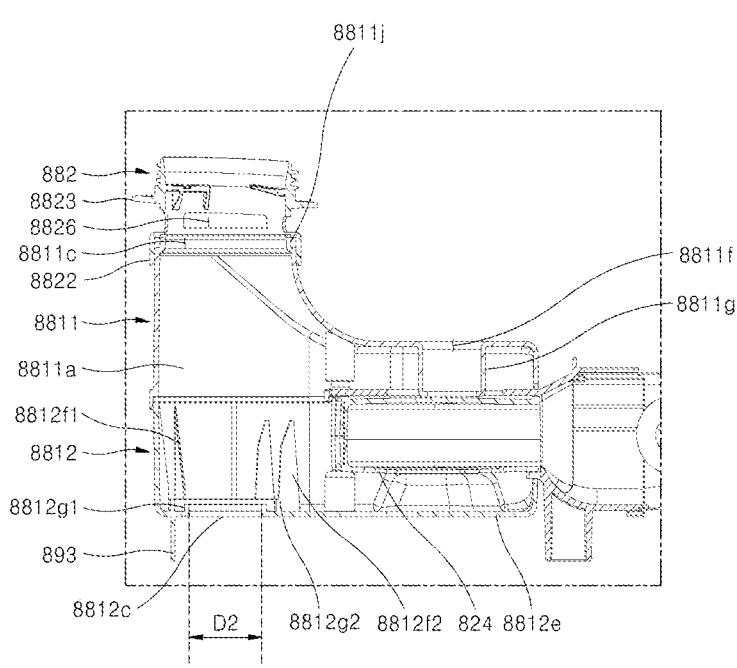
FIG. 21 is a partially enlarged view of FIG. 11 without a filter member.
Figure 22:
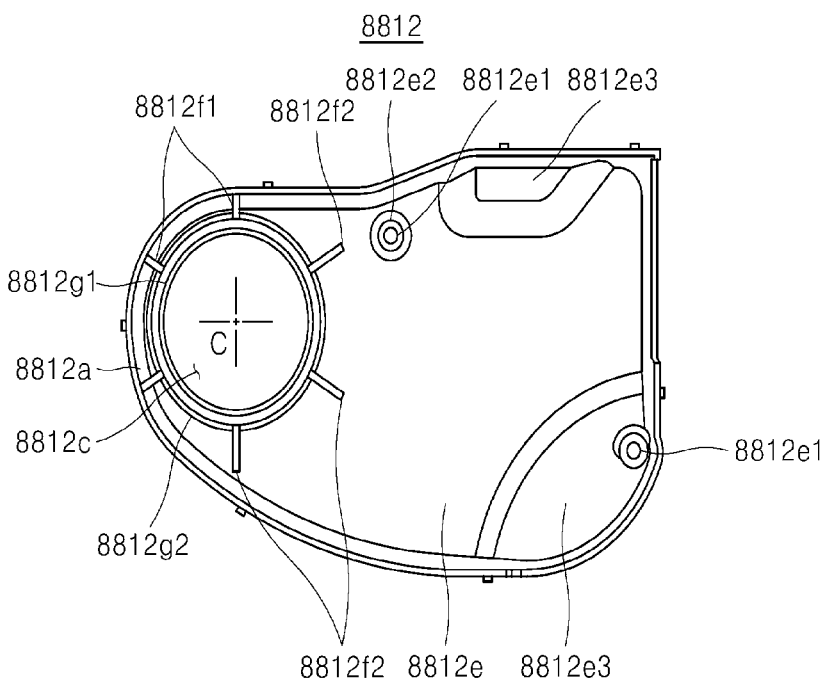
FIG. 22 is a plan view showing a second housing constituting a filter housing.

To guide the movement and position of the filter member 883 that is inserted for replacement, a plurality of filter guide ribs 8812f may be provided at the bottom surface 8812e of the second housing 8812, as illustrated in FIGS. 21 and 22.

FIGS. 21 and 22 show an embodiment comprising a total of six filter guide ribs 8812f, for example. The number of the plurality of filter guide ribs 8812f may vary depending on the shape and size of the filter member 883. Hereafter, an example, which is provided with a total of six filter guide ribs 8812f as illustrated, is described.

The plurality of filter guide ribs 8812f may prevent the lower end of the filter member 883 from escaping from its right position, after the filter member 883 is disposed, by directly contacting the outer circumferential surface 8832 of the filter member 883, as well as guiding the movement and position of the filter member 883 at a time of inserting the filter member 883.

To this end, each of the filter guide ribs 8812f, as illustrated, may be provided as a planar rib the thickness of which remains constant in a direction parallel with the direction in which the filter member 883 is inserted and parallel with the lengthwise direction of the filter member 883. For example, each filter guide rib 8812f may have the same thickness.

Additionally, to minimize flow resistance against dry airflow passing through the outer circumferential surface 8832 of the filter member 883, the filter guide rib 8812f may be arranged in a way that its thickness remains constant in a direction parallel with the radial direction.

Specifically, the plurality of filter guide ribs 8812f, as illustrated, may be arranged in a way that the filter guide rib 8812f extends in radial shape from the center C of the lower suction opening 8812c, around the lower suction opening 8812c, in the state where the lower end of the filter guide rib 8812f integrally connects to the bottom surface 8812e of the second housing 8812. More specifically, the plurality of filter guide ribs 8812f may be arranged in a radial shape, around the second ring-type rib 8812g2 described above.

At this time, the plurality of filter guide ribs 8812f may be arranged at regular intervals around the lower suction opening 8812c and the second ring-type rib 8812g2 such that the filter member 883 is evenly guided and supported by the plurality of filter guide ribs 8812f. As shown in the embodiment, the six filter guide ribs 8812f may be respectively arranged at a 60-degree interval, around the lower suction opening 8812c and the second ring-type rib 8812g2.

As illustrated in FIG. 22, the lower end of the filter guide rib 8812f may integrally connect to the second ring-type rib 8812g2 while being integrally formed on the bottom surface 8812e of the second housing 8812.

Specifically, the radial inner side end portion surface side of the lower end of each of the filter guide ribs 8812f may integrally connect to the second ring-type rib 8812g2.

At this time, a radial distance from the center C of the lower suction opening 8812c to the inner side end portion surface of the lower end of the plurality of filter guide ribs 8812f may be the same as the radius of the inner surface of the second ring-type rib 8812g2, such that the radial inner side end portion surface of the filter guide rib 8812f and the inner circumferential surface of the second ring-type rib 8812g2 form the same surface.

Accordingly, in the state where the filter member 883 is disposed in the filter accommodation space S1, the outer circumferential surface 8832 of the lower end side of the filter member 883 may be supported by contacting the radial inner side end portion surface of the filter guide rib 8812f and the inner circumferential surface of the second ring-type rib 8812g2 at the same time.

To form the simultaneous contact described above, a perpendicular surface may be provided on a portion of the radial inner side end portion surface of the filter guide rib 8812f, to correspond to the shape of the outer circumferential surface 8832 of the filter member 883.

The perpendicular surface may extend along a direction parallel with the direction in which the filter member 883 is inserted from the lower end of the filter guide rib 8812f, preferably, a direction parallel with the perpendicular direction, to have a predetermined height.

Additionally, an inclined surface may be formed at the upper side of the perpendicular surface, on the inner side end portion surface of the filter guide rib 8812f, and a distance between the inclined surface and the filter member 883 decreases gradually toward the lower suction opening 8812c in the downward direction.

In other words, a space formed by the inclined surface of the plurality of filter guide ribs 8812f may expand gradually in a direction opposite to the direction in which the filter member is inserted, i.e., in the upward direction.

Accordingly, the size of the space into which the lower end of the filter member 883 can enter at a time of inserting the filter member 883 may gradually decease, as the filter member 883 moves.

By doing so, as the filter member 883 is inserted downward, the position of the lower end of the filter member 883 may be effectively guided into the space formed among the perpendicular surfaces of the inner side end portion surface of the filter guide rib 8812f.

However, the up-down height of the inclined surface of the plurality of filter guide ribs 8812f may differ. That is, the height of the inclined surface and the entire height of the filter guide rib 8812f may differ with respect to a direction parallel with the direction in which the filter member is inserted.

Figure 23:
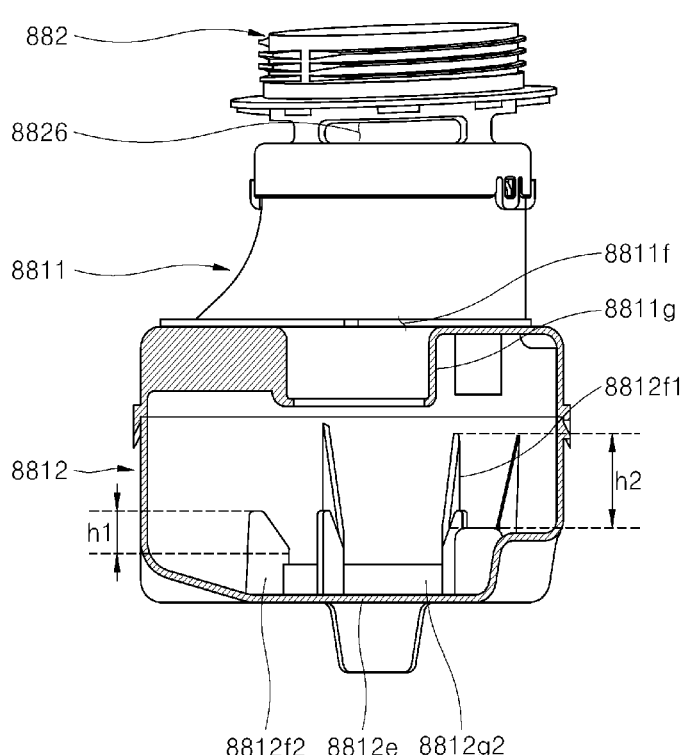
FIG. 23 is a transverse cross-sectional view showing a filter housing.

As illustrated in FIGS. 21 to 23, the plurality of filter guide ribs 8812f may be divided into a first guide rib 8812f1 having a relatively high inclined surface, and a second guide rib 8812f2 having a relatively low inclined surface, with respect to a direction parallel with the direction in which the filter member is inserted.

The height h2 of the inclined surface of the first guide rib 8812f1 and the entire height of the first guide rib 8812f1 may be greater than that of the height hl of the inclined surface of the second guide rib 8812f2 and the entire height of the second guide rib 8812f2.

Additionally, the radial outer side end portion surface of the first guide rib 8812f1 may integrally connect to the inner surface of the second housing 8812, as illustrated.

Accordingly, the lower end and radial outer side end portion surface of the first guide rib 8812f1 may integrally connect to the bottom surface 8812e and outer perimeter surface of the second housing 8812 respectively.

By doing so, the first guide rib 8812f1 may help to improve the strength of the second housing 8812.

Further, the radial outer side end portion surface of the second guide rib 8812f2 may separate from the inner surface of the second housing 8812, as illustrated.

Further, with respect to the position of the second guide rib 8812f2 relative to the fan housing 82, the second guide rib 8812f2 may be disposed horizontally closer to the fan housing 82 than the first guide rib 8812f1.

Accordingly, the second guide rib 8812f2 may serve as a vane that guides filtered air having passed through the outer circumferential surface 8832 of the filter member 883 to the open lower surface 824 of the fan housing 82 effectively.

However, to guide the flow of filtered air effectively and minimize flow resistance against filtered air, the up-down position of the upper end of the second guide rib 8812f2 may be limited between the lower surface 824 and the upper surface 821 of the fan housing 82, as illustrated in FIG. 21.

[Detailed Configuration of First Blocking Rib]

Hereafter, a detailed configuration of the above-described first blocking rib 8811i1 is described with reference to FIGS. 24 and 25.

Figure 24:
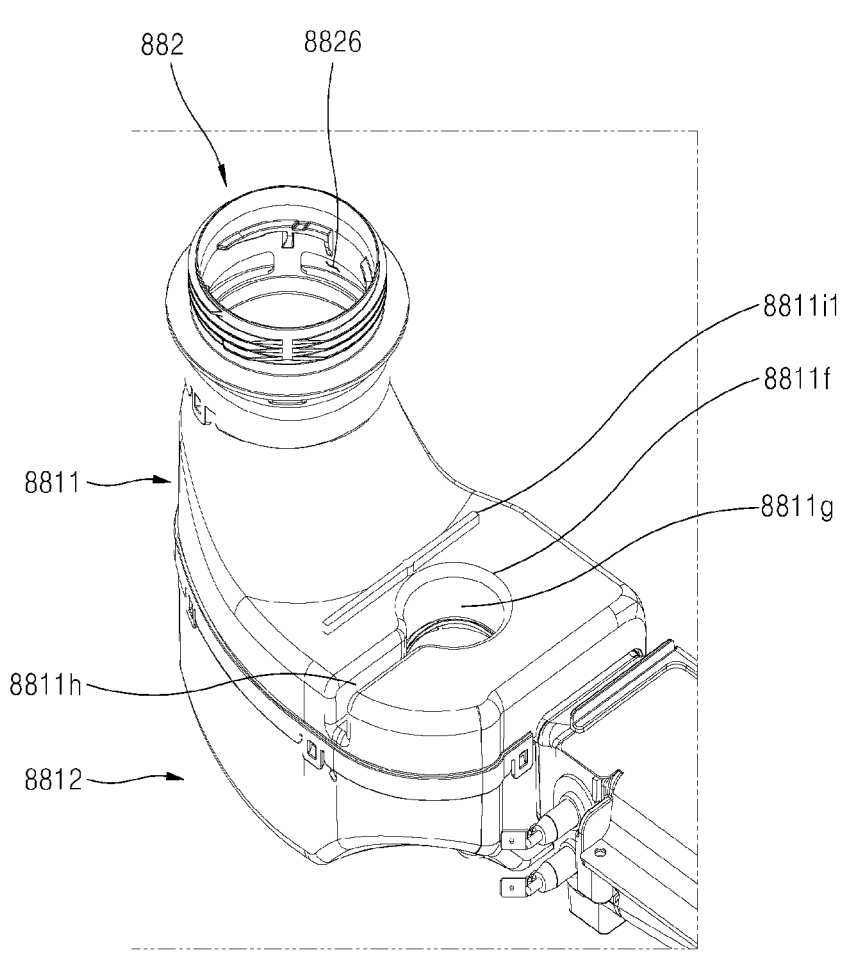
FIG. 24 is a front perspective view showing a filter housing provided with a first blocking rib.
Figure 25:
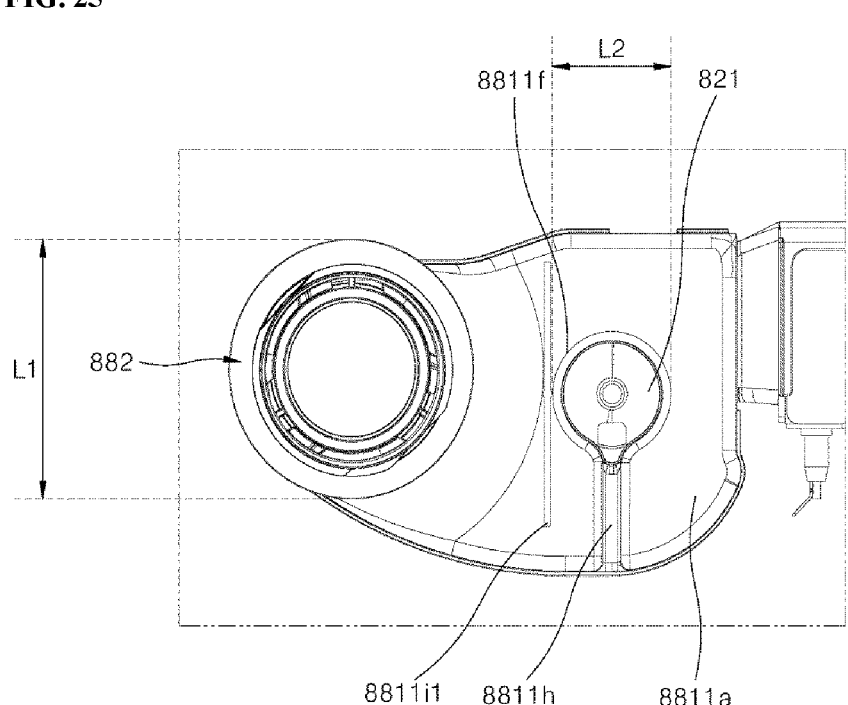
FIG. 25 is a plan view of FIG. 24.

As illustrated in FIGS. 24 and 25, the first blocking rib 8811i1 may be disposed between the tub connection duct 882 forming the upper end of the first housing 8811 with respect to the horizontal direction, and the vent hole 8811f, and integrally formed on the upper surface of the first housing 8811 in the form of a barrier protruding upward from the upper surface of the first housing 8811.

Accordingly, since the first blocking rib 8811i1 protrudes from the upper surface of the first housing 8811, the up-down position of the upper end of the first blocking rib 8811i1 may be higher than the up-down position of the upper surface of the first housing 8811 and the up-down position of the vent hole 8811f.

At this time, to stop wash water moving from the tub connection duct 882 from flowing into the vent hole 8811f, the first blocking rib 8811i1 may extend in a direction across the flow direction of the wash water.

With respect to the flow direction of dry airflow, the first blocking rib 8811i1 may be disposed further downstream than the tub connection duct 882 and disposed further upstream than the vent hole 8811f, since the tub connection duct 882 is disposed further upstream than the vent hole 8811f.

Additionally, with respect to the flow direction of dry airflow, the first blocking rib 8811i1 may have a shape in which a length L1 in a direction across the flow direction of dry airflow is greater than a thickness and an up-down height in a direction parallel with the flow direction of dry airflow.

At this time, cover the vent hole 8811f entirely from the upper stream side of the vent hole 8811f, the length L1 of the first blocking rib 8811i1 may be greater than the diameter L2 of the vent hole 8811f.

Additionally, in the state where the filter housing 881 is disposed on the base 90, the first blocking rib 8811i1 may be disposed on the left side of the tub connection duct 882 and on the right side of the vent hole 8811f, and extend linearly from the front surface of the first housing 8811 toward the rear surface thereof.

Specifically, the first blocking rib 8811i1 may extend continuously from the front edge of the upper surface of the first housing 8811 to the rear edge thereof linearly.

Additionally, the height of the upper surface of the first blocking rib 8811i1 from the upper surface of the first housing 8811 may remain constant approximately.

Thus, as shown in the illustrative embodiment, when the first blocking rib 8811i1 is disposed on the upper surface of the fan housing accommodation part 8811b of the first housing 8811, which is a flat surface in a direction parallel with the horizontal direction, the up-down position of the upper end of the first blocking rib 8811i1 may remain constant along the lengthwise direction of the first blocking rib 8811i1.

When the first blocking rib 8811i1 is disposed on the upper surface of the filter accommodation part 8811a of the first housing 8811, which is a curved surface that has different up-down heights depending on positions, the up-down position of the upper end of the first blocking rib 8811i1 may change to correspond to the shape of the upper surface of the filter accommodation part 8811a, such that the height of the first blocking rib 8811i1 from the upper surface of the first housing 8811 may remain constant.

Further, in some implementations, the second blocking rib 8811i2 may be further provided on the inclined surface 8811b1 of the first housing 8811, between the first blocking rib 8811i1 and the tub connection duct 882, as described above, and may extend along the front-rear direction in a curved line shape.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the scope of the disclosure though not explicitly described in the description of the embodiments.

The invention claimed is:

1. A dishwasher, comprising:
a tub that defines a wash space configured to accommodate a wash target; and
a dry air supply configured to generate dry airflow for drying the wash target and to supply the dry airflow into the tub, the dry air supply comprising:
a filter member configured to filter air to be supplied to the wash space, and
a filter housing that accommodates the filter member, the filter member being configured to be inserted into and withdrawn from the filter housing,
wherein the dry air supply further comprises a projection that protrudes from the filter member or the filter housing, the projection being configured to guide the filter member to the filter housing or to restrict the filter member from escaping from the filter housing,
wherein the projection comprises a gasket configured to cover a separation space defined between the filter housing and the filter member, the gasket being configured to contact the filter member,
wherein the gasket comprises:
a coupling part that has a cylindrical shape and is fixed to an outer circumferential surface of the filter housing; and
a blocking part that has a plate shape having an open hole therein, the blocking part being connected to an upper end of the coupling part, and
wherein the coupling part and the blocking part are made of an elastic material.

2. The dishwasher of claim 1, wherein the projection comprises a grip part that protrudes upward from an upper surface of the filter member.

3. The dishwasher of claim 2, wherein the grip part has a first end and a second end that are connected to the upper surface of the filter member.

4. The dishwasher of claim 2, wherein the filter housing defines a filter accommodation space configured to accommodate the filter member,
wherein the filter housing has an opening configured to allow the filter member to inserted into and withdrawn from the filter accommodation space, and
wherein at least a portion of the filter housing passes through the tub and is exposed to the wash space.

5. The dishwasher of claim 4, further comprising a sealing cap that is detachably coupled to the filter housing and configured to open and close the opening of the filter housing,
wherein the sealing cap is configured to couple to contact the grip part of the filter member in the filter accommodation space.

6. The dishwasher of claim 5, wherein the sealing cap comprises a cap projection that protrudes toward the filter accommodation space.

7. The dishwasher of claim 6, wherein the cap projection has a cylindrical rib that protrudes downward from a bottom surface of the sealing cap.

8. The dishwasher of claim 7, wherein an outer diameter of the cap projection is greater than a horizontal width of the grip part.

9. The dishwasher of claim 7, wherein the filter housing defines an upper suction opening at an upper side of the filter accommodation space, the upper suction opening configured to provide air to an upper opening of the filter member, and
wherein the cap projection and the grip part are configured to contact each other at a position above the upper suction opening.

10. The dishwasher of claim 1, wherein the blocking part is configured to cover the separation space.

11. The dishwasher of claim 1, wherein a perpendicular thickness of the blocking part is less than a horizontal thickness of the coupling part.

12. The dishwasher of claim 1, wherein a diameter of the open hole of the blocking part is less than an inner diameter of the coupling part.

13. The dishwasher of claim 1, wherein the filter housing defines a lower suction opening at a lower portion thereof, and
wherein the projection comprises a filter guide rib that protrudes from the filter housing and is configured to guide movement of the filter member based on the filter member being inserted into the filter housing.

14. The dishwasher of claim 13, wherein the projection further comprises a protruding rib that protrudes upward from a bottom surface of the filter housing and is connected to the filter guide rib.

15. The dishwasher of claim 14, wherein a lower end of the filter guide rib is connected to the protruding rib.

16. The dishwasher of claim 14, wherein a radial distance from a center of the lower suction opening to a lower end of the filter guide rib is equal to a radius of a circle defined by an inner surface of the protruding rib.

17. The dishwasher of claim 13, wherein the projection comprises:
a first protruding rib that protrudes upward from a bottom surface of the filter housing and extends along a circumference of the lower suction opening; and
a second protruding rib that protrudes upward from the bottom surface of the filter housing and is disposed outside the first protruding rib in a radial direction of the lower suction opening, and
wherein a lower end of the filter housing is configured to be inserted into a position between the first protruding rib and the second protruding rib.

18. The dishwasher of claim 1, wherein the dry air supply further comprises a fan housing that accommodates an air blowing fan configured to generate the dry airflow,
wherein the filter housing defines a vent hole at an upper surface thereof, the vent hole exposing an upper side of the fan housing outward, and
wherein the filter housing comprises a blocking rib that protrudes upward from the upper surface of the filter housing and is disposed between a portion of the filter housing and the vent hole, the portion of the filter housing passing through the tub and being exposed to the wash space.

* * * * *